United States Patent
Yano

(10) Patent No.: US 9,332,183 B2
(45) Date of Patent: May 3, 2016

(54) IMAGING DEVICE AND METHOD OF CONTROLLING IMAGING DEVICE

(71) Applicant: OLYMPUS CORPORATION, Tokyo (JP)

(72) Inventor: Takahiro Yano, Akishima (JP)

(73) Assignee: OLYMPUS CORPORATION, Tokyo (JP)

( * ) Notice: Subject to any disclaimer, the term of this patent is extended or adjusted under 35 U.S.C. 154(b) by 116 days.

(21) Appl. No.: 13/721,511

(22) Filed: Dec. 20, 2012

(65) Prior Publication Data

US 2013/0107063 A1    May 2, 2013

Related U.S. Application Data

(63) Continuation of application No. PCT/JP2011/065439, filed on Jul. 6, 2011.

(30) Foreign Application Priority Data

Jul. 16, 2010  (JP) .................................. 2010-161280

(51) Int. Cl.
*H04N 5/232* (2006.01)
*G03B 7/08* (2014.01)
*G03B 5/00* (2006.01)

(52) U.S. Cl.
CPC .............. *H04N 5/23248* (2013.01); *G03B 5/00* (2013.01); *G03B 7/08* (2013.01); *H04N 5/23254* (2013.01); *H04N 5/23267* (2013.01)

(58) Field of Classification Search
CPC .......... H04N 5/23254; H04N 5/35527; H04N 5/2355; H04N 5/2354

USPC ...................................................... 348/208.4
See application file for complete search history.

(56) References Cited

U.S. PATENT DOCUMENTS

| | | | |
|---|---|---|---|
| 4,713,697 A | 12/1987 | Gotou et al. | |
| 4,927,250 A | 5/1990 | Suda | |
| 2003/0099467 A1 | 5/2003 | Inoue et al. | |
| 2004/0239771 A1* | 12/2004 | Habe ........................ | 348/208.12 |
| 2006/0291841 A1 | 12/2006 | Fukumoto et al. | |
| 2007/0258707 A1* | 11/2007 | Raskar ............................ | 396/52 |

(Continued)

FOREIGN PATENT DOCUMENTS

| | | |
|---|---|---|
| JP | 61-223819 A | 10/1986 |
| JP | 61-240780 A | 10/1986 |
| JP | 06-276512 A | 9/1994 |

(Continued)

OTHER PUBLICATIONS

Exposure-Adaptive Color image enhancement, Jae Hyun (2009).*

(Continued)

*Primary Examiner* — Ahmed A Berhan
(74) *Attorney, Agent, or Firm* — Holtz, Holtz & Volek PC

(57) ABSTRACT

An imaging device that captures an image using an imaging section includes a control section that controls a signal modulation process that decreases or increases a signal level of an image signal acquired by the imaging section during an exposure period from a start of exposure to an end of exposure when the imaging section captures an image, and a blur correction section that performs a blur correction process on the image signal subjected to the signal modulation process.

21 Claims, 13 Drawing Sheets

(56) References Cited

U.S. PATENT DOCUMENTS

2009/0225202 A1 9/2009 Hata
2011/0141298 A1 6/2011 Nishiyama

FOREIGN PATENT DOCUMENTS

| | | |
|---|---|---|
| JP | 06-343159 A | 12/1994 |
| JP | 07-226905 A | 8/1995 |
| JP | 2006-333061 A | 12/2006 |
| JP | 2008-249941 A | 10/2008 |
| JP | 2009-522825 A | 6/2009 |
| JP | 2009-171341 A | 7/2009 |
| JP | 2009-213044 A | 9/2009 |
| JP | 2009-532928 A | 9/2009 |
| JP | 2010-050745 A | 3/2010 |
| JP | 2011-078074 A | 4/2011 |
| WO | WO2007/129762 A2 | 11/2007 |
| WO | WO2007/129766 A1 | 11/2007 |
| WO | WO2010/021249 A1 | 2/2010 |

OTHER PUBLICATIONS

International Search Report dated Aug. 16, 2011 (in English) in counterpart International Application No. PCT/JP2011/065439.
Qi Shan et al; High-Quality Motion Deblurring From a Single Image; ACM Transactions on Graphics, vol. 27, No. 3, Aug. 2008.
A. Levin et al; Image and Depth From a Conventional Camera With a Coded Aperture; Massachusetts Institute of Technology, Computer Science & Artificial Intelligence Laboratory; 2007.

* cited by examiner

FIG. 4A
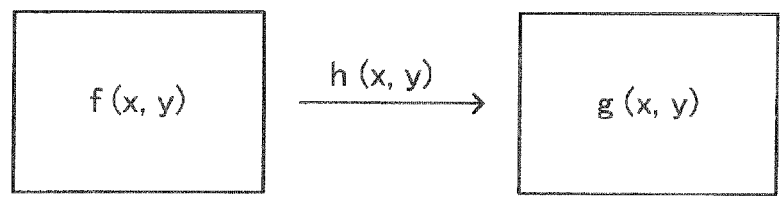
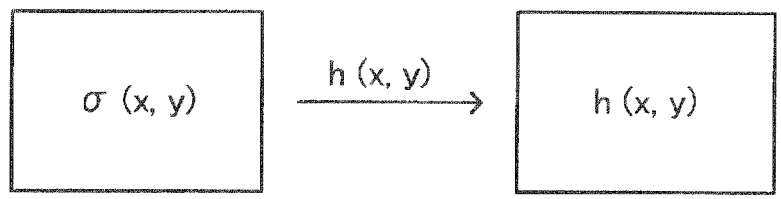
FIG. 4B
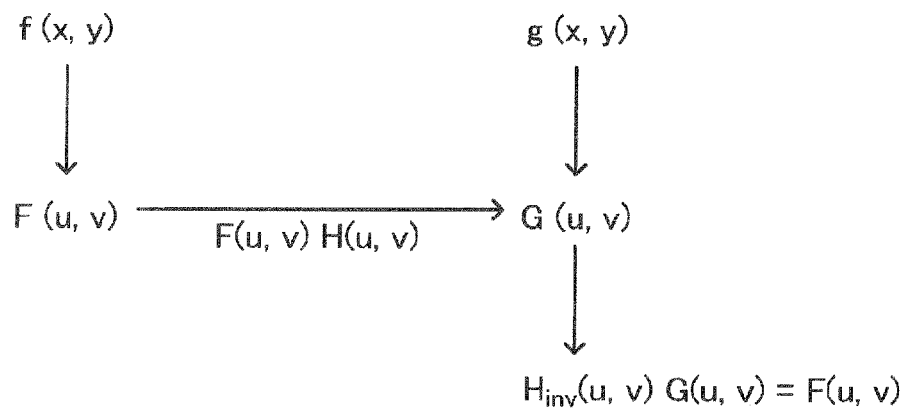

FIG. 5A
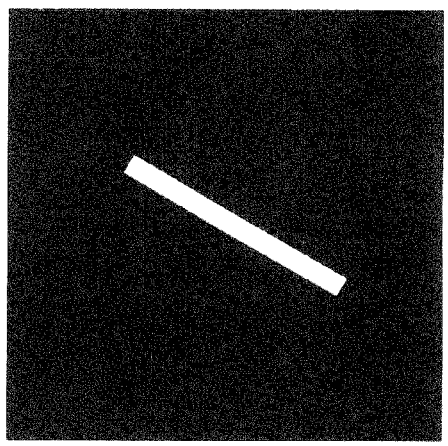
FIG. 5B
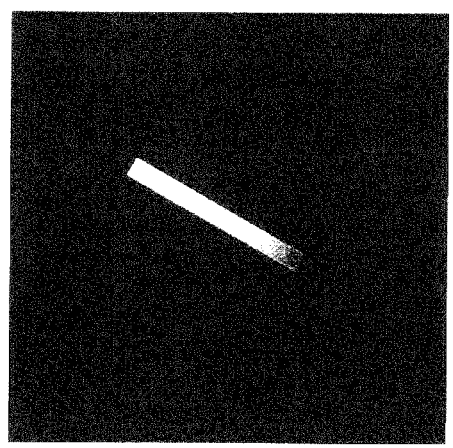
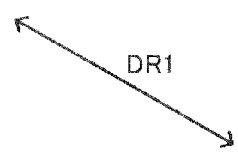
FIG. 6
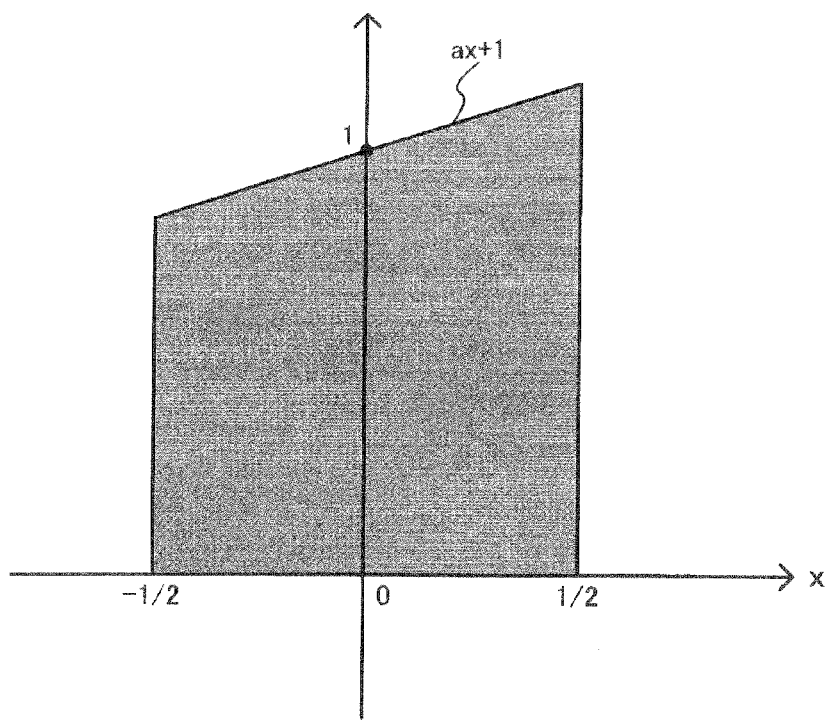

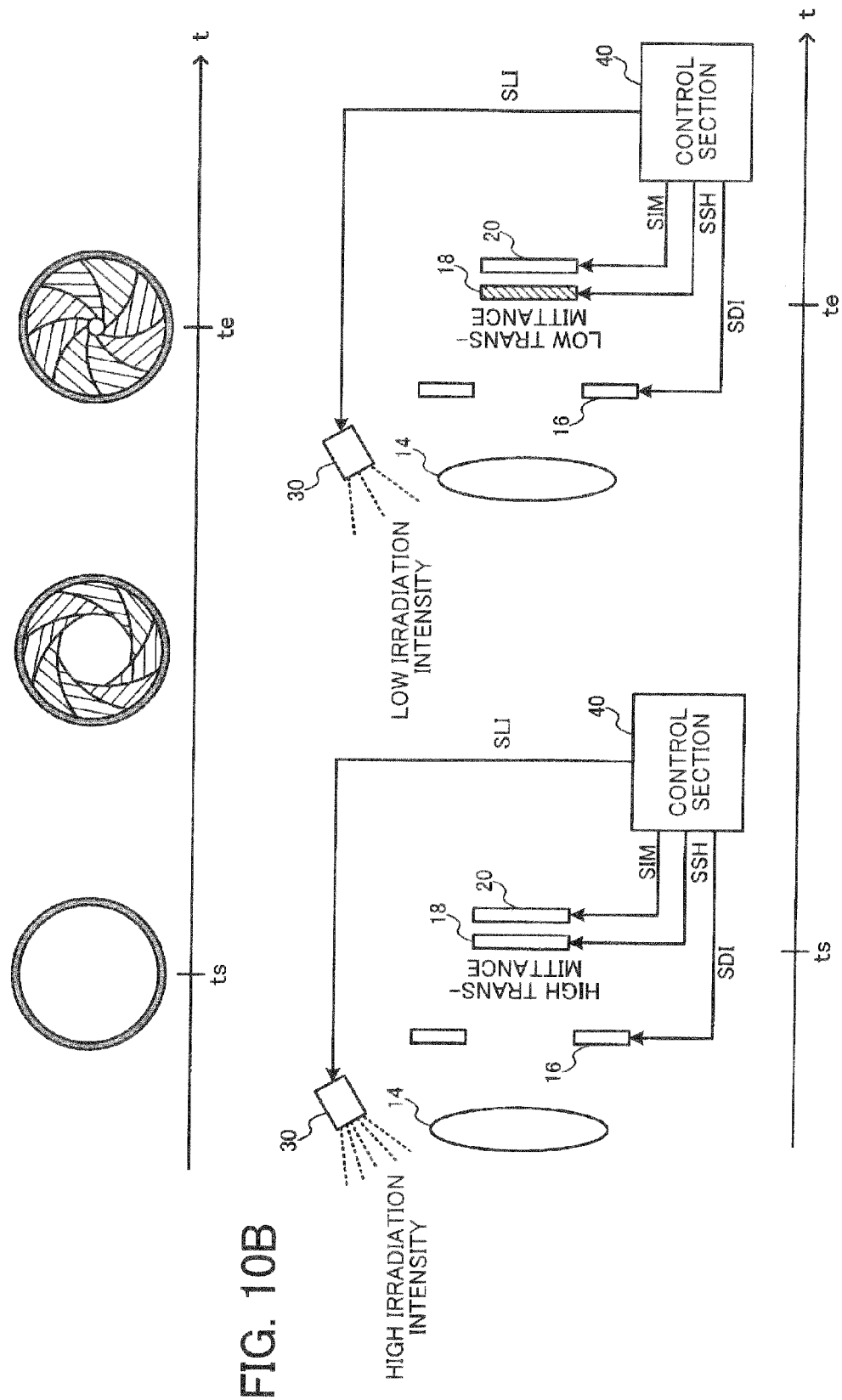

IMAGING DEVICE AND METHOD OF CONTROLLING IMAGING DEVICE

CROSS REFERENCE TO RELATED APPLICATION

This application is a continuation of International Patent Application No. PCT/JP2011/065439, having an international filing date of Jul. 6, 2011, which designated the United States, the entirety of which is incorporated herein by reference. Japanese Patent Application No. 2010-161280 filed on Jul. 16, 2010 is also incorporated herein by reference in its entirety.

BACKGROUND

The present invention relates to an imaging device, a method of controlling an imaging device, and the like.

An imaging device (camera) may be provided with a blur correction function (image stabilization function) in order to prevent a deterioration in captured image due to shake (motion) of the imaging device (camera) during the imaging (capture) operation. The blur correction technique may be roughly classified into the following three techniques.

The first technique is an optical blur correction technique that detects the motion (vibrations) of the imaging device using a motion sensor (e.g., angular velocity sensor or acceleration sensor), and corrects blurring by driving an optical system (e.g., lens or variable apex angle prism) corresponding to the detected motion amount (see JP-A-61-240780 and JP-A-61-223819, for example).

The second technique provides only a shake detection motion sensor in the imaging device to record shake information, and corrects blurring by performing a blur correction process during viewing using the shake information (see JP-A-6-276512, JP-A-6-343159, and JP-A-7-226905, for example).

The third technique acquires (calculates) blur information from the captured image, and performs a blur correction process using the blur information when reading the image. For example, the non-blurred image is restored from the deteriorated image by digital processing (e.g., inverse filter, Wiener filter, or Richardson-Lucy method).

A technique that improves the frequency characteristics of the point spread function during the imaging operation, and then performs a blur correction process has also been known. For example, JP-T-2009-532928 and JP-T-2009-522825 improve the frequency characteristics of the point spread function during the imaging operation by quickly and repetitively opening and closing (hereinafter referred to as "fluttering") the shutter at a given timing to implement a more accurate blur correction process. JP-A-61-240780 improves the frequency characteristics of the point spread function during the imaging operation by utilizing a coded aperture as the aperture of the imaging device to implement a more accurate blur correction process.

SUMMARY

According to one aspect of the invention, there is provided an imaging device that captures an image using an imaging section, the imaging device comprising:

a control section that controls a signal modulation process that decreases or increases a signal level of an image signal acquired by the imaging section during an exposure period from a start of exposure to an end of exposure when the imaging section captures an image; and a blur correction section that performs a blur correction process on the image signal subjected to the signal modulation process.

According to another aspect of the invention, there is provided a method for controlling an imaging device that captures an image using an imaging section, the method comprising:

controlling a signal modulation process that decreases or increases a signal level of an image signal acquired by the imaging section during an exposure period from a start of exposure to an end of exposure when the imaging section captures an image; and performing a blur correction process on the image signal subjected to the signal modulation process.

BRIEF DESCRIPTION OF THE DRAWINGS

FIGS. 4A and 4B are views illustrating a method that restores the original image based on a point spread function.

FIGS. 5A and 5B illustrate an example of a point spread function.

FIG. 6 illustrates a one-dimensional model of a point spread function.

FIGS. 10A and 10B are views illustrating a signal modulation method implemented by controlling an aperture, a shutter, or a lighting section.

DESCRIPTION OF EXEMPLARY EMBODIMENTS

Figure 1A:
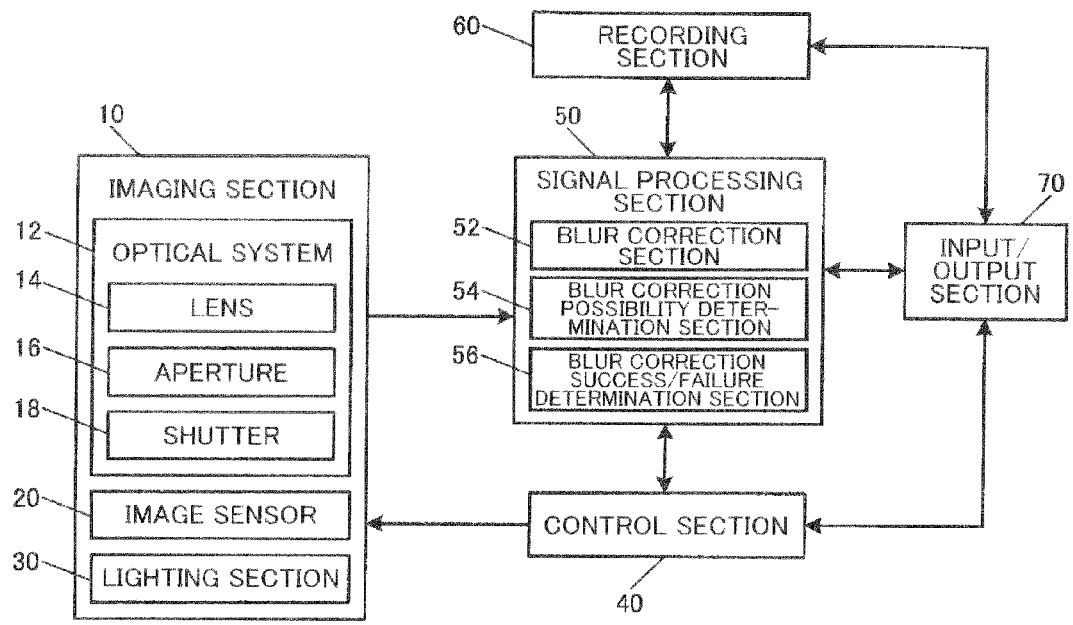
FIGS. 1A and 1B illustrate a configuration example of an imaging device according to one embodiment of the invention.

According to one embodiment of the invention, there is provided an imaging device that captures an image using an imaging section, the imaging device comprising:

a control section that controls a signal modulation process that decreases or increases a signal level of an image signal acquired by the imaging section during an exposure period from a start of exposure to an end of exposure when the imaging section captures an image; and a blur correction section that performs a blur correction process on the image signal subjected to the signal modulation process.

According to the imaging device, the control section controls the signal modulation process that decreases or increases the signal level of the image signal during the exposure period when the imaging section captures an image. The blur correction process is performed on the image signal subjected to the signal modulation process to acquire the image subjected to the blur correction process. It is possible to improve the frequency characteristics of the point spread function by performing the signal modulation process and the blur correction process, so that a more accurate blur correction process can be implemented.

In the imaging device, the control section may control the imaging section so that the signal modulation process that gradually decreases or increases the signal level of the image signal is performed during the exposure period.

According to the above configuration, since only the signal modulation process that gradually decreases or increases the signal level is performed on the image before the blur correction process, unnaturalness due to the signal modulation process occurs to only a small extent. This makes it possible to effectively use the image that is not subjected to the blur correction process when the blur correction process has failed, for example.

In the imaging device, the control section may control the imaging section so that the signal modulation process that decreases or increases the signal level of the image signal in a stepwise manner is performed during the exposure period.

It is also possible to improve the frequency characteristics of the point spread function by performing the signal modulation process that decreases or increases the signal level in a stepwise manner, so that a more accurate blur correction process can be implemented.

In the imaging device, the control section may control the signal modulation process that decreases a number of zero points of an amplitude spectrum of a point spread function in a usage frequency range.

It is possible to suppress process failure due to occurrence of an ill-posed problem during the blur correction process by thus decreasing the number of zero points in the usage frequency range.

In the imaging device, the control section may control an optical system of the imaging section so that the signal modulation process that decreases or increases the signal level of the image signal is performed during the exposure period.

This makes it possible to implement the signal modulation process that decreases or increases the signal level of the image signal by controlling the optical system of the imaging section to improve the frequency characteristics of the point spread function.

In the imaging device, the control section may gradually close or open an aperture of the optical system during the exposure period.

This makes it possible to implement the signal modulation process that gradually decreases or increases the signal level of the image signal by performing a simple control process that gradually closes or opens the aperture of the optical system during the exposure period.

In the imaging device, the optical system may include a shutter for which a light transmittance is variably set, and the control section may gradually decrease or increase the light transmittance of the shutter during the exposure period.

This makes it possible to implement the signal modulation process that gradually decreases or increases the signal level of the image signal by gradually changing the opacity of the shutter during the exposure period.

In the imaging device, the imaging section may include a lighting section that applies light to an object, and the control section may gradually decrease or increase an irradiation intensity of light emitted from the lighting section during the exposure period.

This makes it possible to implement the signal modulation process that gradually decreases or increases the signal level of the image signal by performing a simple control process that controls the irradiation intensity of light emitted from the lighting section.

In the imaging device, the control section may control an image sensor included in the imaging section so that the signal modulation process that decreases or increases the signal level of the image signal is performed during the exposure period.

This makes it possible to implement the signal modulation process that decreases or increases the signal level of the image signal by controlling the image sensor included in the imaging section.

In the imaging device, the control section may gradually decrease or increase a period from a charge storage start timing to a charge transfer timing of the image sensor.

The signal level of the image signal acquired by the image sensor gradually decreases or increases as a result of gradually decreasing or increasing the transfer period of a charge stored in the image sensor, so that the frequency characteristics of the point spread function can be improved.

In the imaging device, the control section may gradually decrease or increase a signal gain of a charge that is stored in and transferred from the image sensor.

The signal level of the image signal acquired by the image sensor gradually decreases or increases as a result of gradually decreasing or increasing the signal gain of a charge stored in the image sensor, so that the frequency characteristics of the point spread function can be improved.

In the imaging device, the blur correction section may perform the blur correction process that obtains an original image before blurring based on a point spread function and the blurred image, the point spread function being estimated from a blurred image represented by the image signal subjected to the signal modulation.

It is possible to restore the non-blurred original image by estimating the point spread function that reflects the deterioration process from the blurred image, and performing the blur correction process using the estimated point spread function.

In the imaging device, the blur correction section may perform the blur correction process that obtains the original image of an entire image area based on the point spread function estimated within an image area that is smaller than the entire image area.

According to the above configuration, since it is unnecessary to estimate the point spread function over the entire image area, it is possible to reduce the processing load when performing the point spread function estimation process and the like.

The imaging device may further comprise:

a blur correction possibility determination section that determines whether or not the blur correction process performed by the blur correction section is possible.

According to the above configuration, whether or not the blur correction process is possible may be determined before the blur correction section performs the blur correction process, and the image that is not subjected to the blur correction process may be used when it has been determined that the blur correction process is impossible, for example.

In the imaging device, the blur correction possibility determination section may determine whether or not the blur correction process is possible based on sensor information from a sensor that detects a motion of the imaging device.

According to the above configuration, it may be determined that the blur correction process is possible when it has been determined that the motion of the imaging device is small based on the sensor information from the sensor, and it may be determined that the blur correction process is impossible when it has been determined that the motion of the imaging device is large based on the sensor information from the sensor, for example.

In the imaging device, the blur correction possibility determination section may estimate a point spread function from a blurred image represented by the image signal subjected to the signal modulation process, and may determine whether or not the blur correction process is possible based on the estimated point spread function.

According to the above configuration, whether or not the blur correction process can be performed on the blurred image can be determined based on the size of the point spread function estimated from the blurred image, for example.

In the imaging device, the blur correction section may perform the blur correction process that obtains an original image before blurring using the point spread function estimated by the blur correction possibility determination section.

This makes it possible to prevent a situation in which the point spread function is estimated during both the blur correction possibility determination process and the blur correction process. Therefore, the processing efficiency can be improved while reducing the processing load.

The imaging device may further comprise:

a recording section, an image obtained by the blur correction process being stored in the recording section as a captured image when the blur correction possibility determination section has determined that the blur correction process is possible, and an image that is not subjected to the blur correction process being stored in the recording section as the captured image when the blur correction possibility determination section has determined that the blur correction process is impossible.

According to the above configuration, the image obtained by the blur correction process is stored in the recording section, and can be used as the captured image when the blur correction possibility determination section has determined that the blur correction process is possible. On the other hand, the image that is not subjected to the blur correction process is stored in the recording section, and can be used as the captured image when the blur correction possibility determination section has determined that the blur correction process is impossible. This makes it possible to use a more natural image as the captured image.

The imaging device may further comprise:

a blur correction success/failure determination section that determines whether or not the blur correction process has succeeded.

According to the above configuration, whether or not the blur correction process has succeeded can be determined after the blur correction section has performed the blur correction process, and the image that is not subjected to the blur correction process can be used when it has been determined that the blur correction process has failed, for example.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Configuration Example

FIG. 1A illustrates a configuration example of an imaging device according to one embodiment of the invention. The imaging device according to one embodiment of the invention may be an electronic camera (e.g., digital still camera or video camera), a silver salt camera, or an imaging device provided in a mobile phone, a personal digital assistant (portable information terminal), a portable game device, or the like.

The imaging device illustrated in FIG. 1A includes an imaging section 10, a control section 40, and a signal processing section 50. The imaging device may also include a recording section 60 and an input/output section 70. The imaging section 10 is connected to the control section 40 and the signal processing section 50. The control section 40 is connected to the imaging section 10, the signal processing section 50, and the input/output section 70. The signal processing section 50 is connected to the imaging section 10, the control section 40, the recording section 60, and the input/output section 70.

The imaging section 10 captures an image of an object (imaging target), and includes an optical system 12, an image sensor 20, and a lighting section 30.

Figure 1B:
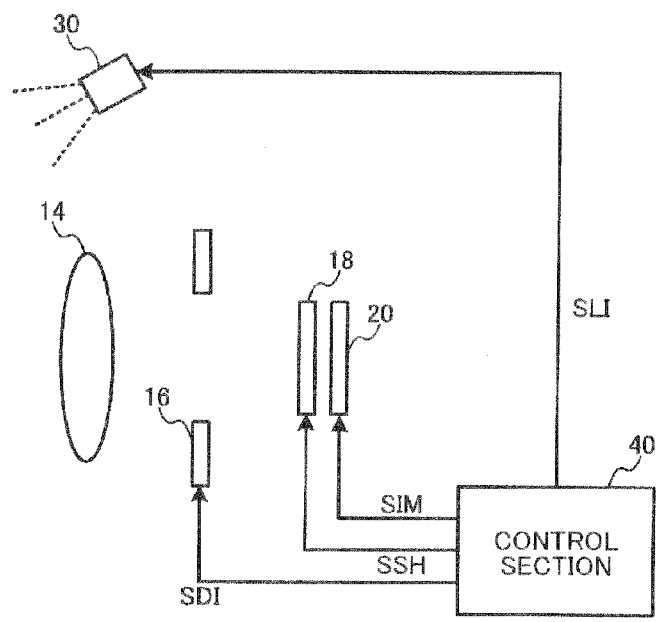

The optical system 12 includes a lens 14, an aperture 16, and a shutter 18. The lens 14 is a focus lens for adjusting the focus, a zoom lens, or the like. The aperture 16 (aperture mechanism) is used to adjust the quantity of light that enters the optical system 12. For example, the aperture 16 is disposed between the lens 14 and the image sensor 20 (imaging plane) (see FIG. 1B). The aperture 16 may have a structure formed by a plurality of overlapping blades (aperture blades), for example. A mechanical shutter, an electronic shutter, or the like may be used as the shutter 18. When it is desired to control the transmittance of incident light, a shutter for which the light transmittance (opacity) can be variably set (e.g., liquid crystal shutter) may be used as the shutter 18.

The image sensor 20 is a device that captures the object, and is implemented by a CCD sensor, a CMOS sensor, or the like. The lighting section 30 applies light to the object, and is implemented by an LED light, a flash, or the like.

The control section 40 controls the imaging section 10, and also controls the entire imaging device, for example. More specifically, the control section 40 outputs control signals SDI, SSH, SIM, and SLI respectively to the aperture 16, the shutter 18, the image sensor 20, and the lighting section 30 included in the imaging section 10 to control the aperture 16, the shutter 18, the image sensor 20, and the lighting section 30 (see FIG. 1B).

The signal processing section 50 performs various types of signal processing (e.g., signal processing for improving the image quality) on an image signal output from the imaging section 10. The signal processing section 50 includes a blur correction section 52, a blur correction possibility determination section 54, and a blur correction success/failure determination section 56.

The recording section 60 records (stores) an image obtained by signal processing. The recording section 60 may be implemented by a semiconductor memory (e.g., SRAM, DRAM, or EEPROM), a hard disk, or the like.

The input/output section 70 allows the user to input various types of information, and displays various types of information, a live-view image, and the like to the user. The input/output section 70 is implemented by an operation button, a dial, a display panel (e.g., liquid crystal panel), and the like.

An image of the object that has been captured by (through) the imaging section 10 is recorded in the recording section 60. For example, the aperture 16, the shutter 18, the image sensor 20, and the lighting section 30 operate so that the signal level of the image signal decreases or increases during an exposure period from the start of exposure to the end of exposure when the imaging section 10 captures an image of the object. Note that these devices may operate either independently or in combination. The user may set the operation of each device in advance via a user interface.

More specifically, when the imaging section 10 captures an image, the control section 40 controls a signal modulation process that decreases or increases the signal level (signal quantity) of the image signal acquired by the imaging section 10 during the exposure period. For example, the control section 40 controls the imaging section 10 so that the signal modulation process that gradually decreases or increases the signal level of the image signal is performed. In other words, the control section 40 controls the signal modulation process that decreases the number of zero points of the amplitude spectrum of the point spread function in the usage frequency range. Note that the signal modulation process that gradually decreases or increases the signal level may be a signal modulation process that decreases or increases the signal level in a stepwise manner.

The term "exposure period" used herein refers to a period from the start of exposure to the end of exposure when the imaging section 10 captures an image. For example, the exposure period is a period in which the shutter 18 is open. Note that the exposure period is not limited to an optical exposure period. It suffices that the exposure period be a period in which exposure for capturing an image is substantially performed. For example, the exposure period may be a period in which the image sensor 20 performs an image capture operation. The signal modulation process that gradually decreases or increases the signal level of the image signal excludes a case where the signal level steeply changes from the minimum value to the maximum value (or from the maximum value to the minimum value) (e.g., rectangular pulse signal). For example, the signal modulation process that gradually decreases or increases the signal level of the image signal is a signal modulation process that gradually decreases or increases the signal level (or decreases or increases the signal level in a stepwise manner) at a given change rate.

The blur correction section 52 performs a blur correction process on the image signal subjected to the signal modulation process. For example, the blur correction section 52 performs the blur correction process that restores the non-blurred original image from the blurred image represented by the image signal subjected to the signal modulation process. More specifically, the blur correction section 52 performs the blur correction process that calculates the non-blurred original image based on the point spread function estimated from the blurred image, and the blurred image.

The blur correction possibility determination section 54 determines whether or not the blur correction process performed by the blur correction section 52 is possible (i.e., whether or not the blur correction process can be appropriately performed). The blur correction section 52 performs the blur correction process when the blur correction possibility determination section 54 has determined that the blur correction process is possible. When the blur correction section 52 has performed the blur correction process, the blur correction success/failure determination section 56 determines whether or not the blur correction process has succeeded.

FIGS. 2A to 3D illustrate examples of the signal modulation process performed by the imaging section 10 and the like under control of the control section 40. Note that the signal modulation method is not limited to the examples illustrated in FIGS. 2A to 3D, but may be modified in various ways.

Figure 2A:
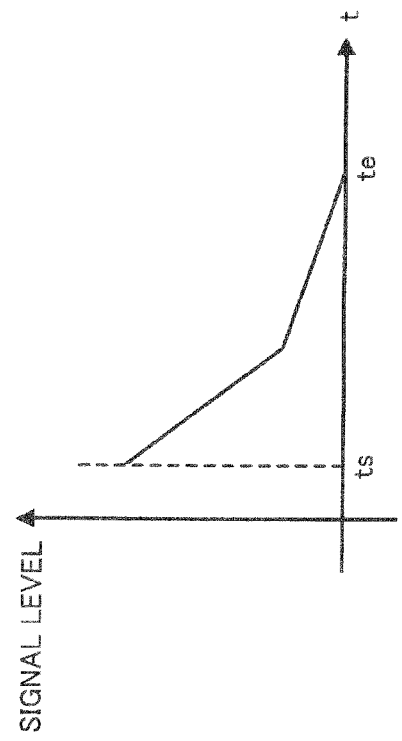
FIGS. 2A to 2D are views illustrating a signal modulation process according to one embodiment of the invention.

In FIG. 2A, the signal level (signal quantity) of the image signal gradually decreases during an exposure period from an exposure start timing ts to an exposure end timing te. For example, the signal level decreases at a given change rate (slope). In FIG. 2B, the signal level of the image signal decreases in a stepwise manner. Specifically, the signal level decreases to have a stair-like waveform.

Figure 2C:
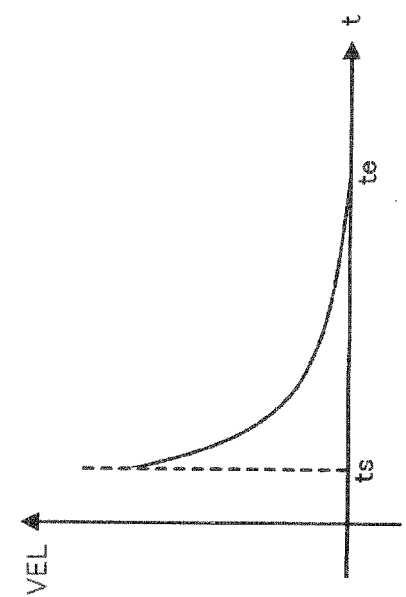
Figure 2B:
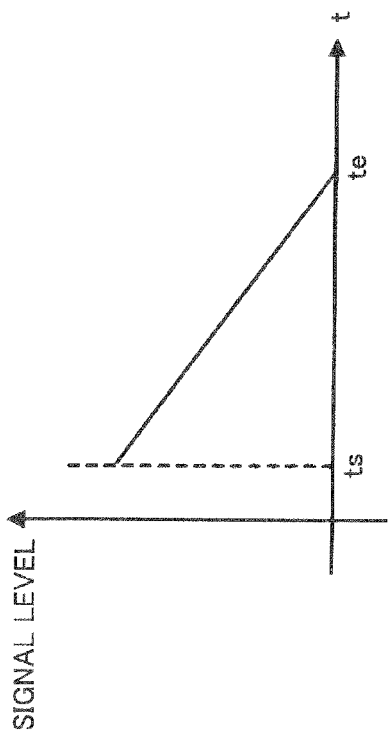
Figure 2D:
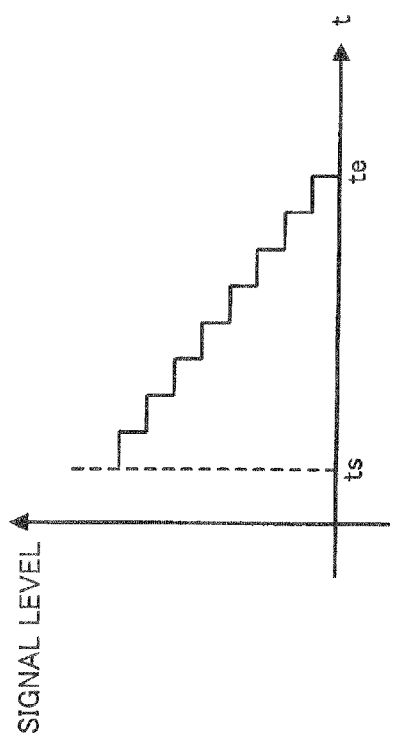
Figure 3C:
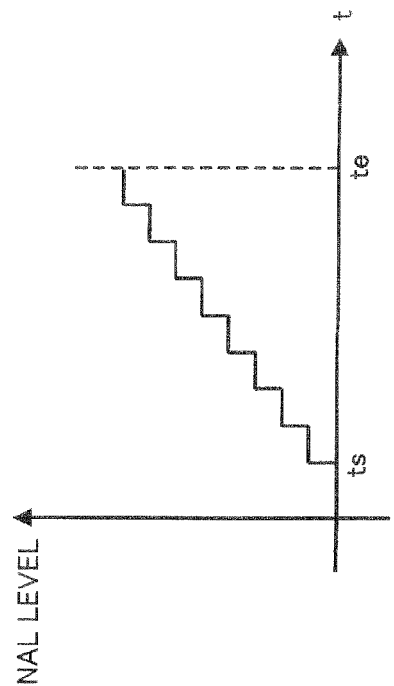
FIGS. 3A to 3D are views illustrating a signal modulation process according to one embodiment of the invention.
Figure 3D:
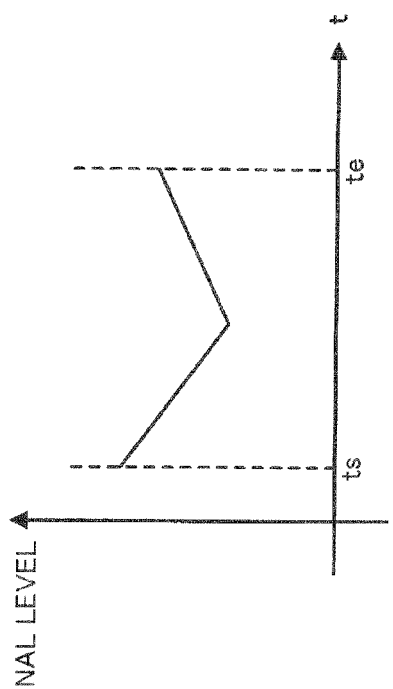
Figure 3A:
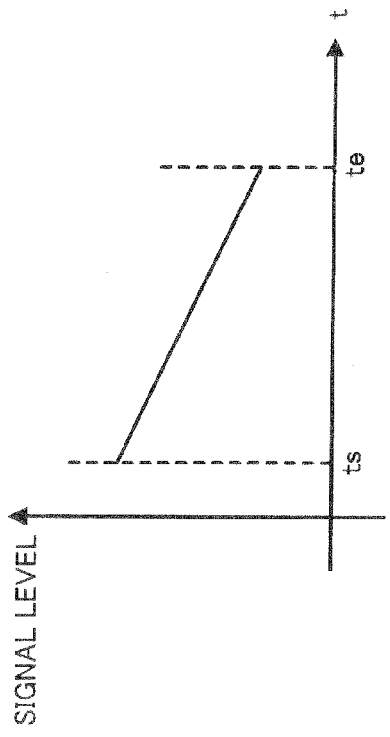
Figure 3B:
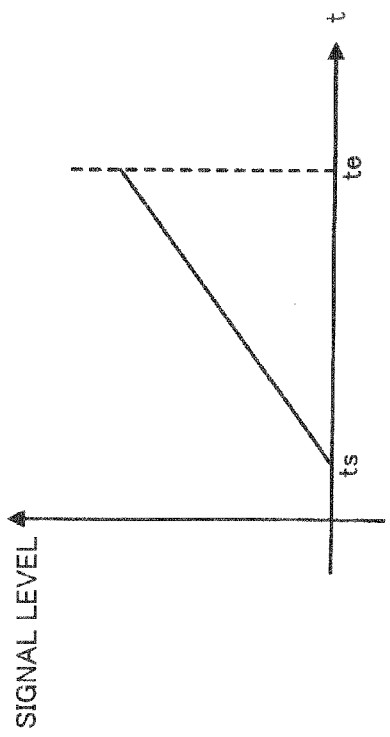

As illustrated in FIG. 2C, the change rate of the signal level may change in the middle of the exposure period, differing from the example illustrated in FIG. 2A in which the signal level decreases at a constant change rate. The signal level need not necessarily change linearly. For example, the signal level may change hyperbolically (see FIG. 2D). The signal level at the exposure end timing te may be higher than 0 (see FIG. 3A), or may be 0. The signal level of the image signal may increase gradually or in a stepwise manner (see FIGS. 3B and 3C). In such a case, the signal level at the exposure start timing ts may be higher than 0, or may be 0. The signal level that has decreased may increase in the middle of the exposure period (see FIG. 3D), and vice versa.

2. Method

The principle of the method according to one embodiment of the invention is described below. In one embodiment of the invention, the frequency characteristics of the point spread function (PSF) are improved by a simple method as compared with the related-art examples. Specifically, the frequency characteristics of the point spread function are improved by decreasing or increasing the signal level (signal quantity) of each point image of an image captured during the exposure period from the start of exposure to the end of exposure.

For example, when using the coding method (e.g., shutter flutter method or coded aperture method) employed in the related-art examples, the image that is not subjected to the blur correction process becomes unnatural due to the effects of the coded point spread function. Therefore, when the blur correction process has failed, the image obtained by the blur correction process also becomes unnatural (i.e., a natural captured image cannot be provided to the user).

The method according to one embodiment of the invention can provide the captured image that is not subjected to the blur correction process to the user when the blur correction process has failed. In one embodiment of the invention, only the simple signal modulation process as illustrated in FIGS. 2A to 3D is performed on the original image signal without performing a coding process using a shutter flutter or a coded aperture. Therefore, it is possible to provide the captured image to the user utilizing the original image signal when the blur correction process has failed.

When using the shutter flutter method or the coded aperture method employed in the related-art examples, it is necessary to provide dedicated hardware (i.e., a flutter mechanism or a coded aperture device).

The method according to one embodiment of the invention has an advantage in that it is unnecessary to provide such additional hardware.

The coded aperture method or the like employed in the related-art examples has a problem in that the quantity of light incident on the image sensor 20 decreases. The signal modulation method according to one embodiment of the invention (see FIGS. 2A to 3D) has an advantage in that it is possible to suppress a decrease in quantity of incident light as compared with the coded aperture method or the like.

The principle of the method according to one embodiment of the invention that improves the frequency characteristics of the point spread function is described in detail below. The point spread function and restoration of the original image based on the point spread function are described below with reference to FIGS. 4A and 4B.

In FIG. 4A, f(x, y) is the non-blurred original image, and g(x, y) is the blurred image that has deteriorated due to the shake (motion) of the imaging device or the like. The relationship between the original image f(x, y) and the blurred image g(x, y) is indicated by g(x, y)=f(x, y)*h(x, y) using a spatial filter h(x, y) that indicates the deterioration process. Note that the symbol "*" indicates a convolution integral. When a two-dimensional delta function δ(x, y) is substituted in the above expression as f(x, y), h(x, y) that indicates the deterioration process is output (see FIG. 4A). h(x, y) that indicates the deterioration process is referred to as the point spread function.

When F(u, v), G(u, v), and H(u, v) are respectively obtained by subjecting f(x, y), g(x, y), and h(x, y) to a Fourier transform, G(u, v)=F(u, v)H(u, v) is satisfied (see FIG. 4B). Therefore, when Hinv(u, v)=1/H(u, v), Hinv(u, v)G(u, v)=F(u, v) is satisfied, and the original image f(x, y) can be restored by subjecting F(u, v) to an inverse Fourier transform. Specifically, the original image f(x, y) can be restored on condition that the point spread function h(x, y) that indicates the deterioration process can be calculated.

The frequency characteristics of the point spread function are improved by performing the signal modulation process as illustrated in FIGS. 2A to 3D. The following description is given taking a one-dimensional point spread function as an example for convenience.

The following expression (1) represents a one-dimensional point spread function.

$$h_{slope}(x) = \text{rect}(x)(ax+1) \quad (1)$$

where, rect(x) is a rect function, and is represented by the following expression (2).

$$\text{rect}(x) = \begin{cases} 1 & \text{if } |x| < \frac{1}{2} \\ 0 & \text{otherwise} \end{cases} \quad (2)$$

hslope(x) represented by the expression (1) is a mere rect function (i.e., a point spread function that indicates flat blurring) when a=0. Specifically, the point spread function hslope(x) indicates blurring when the imaging device or the object has linearly moved at a constant speed in a direction DR1 (see FIG. 5A).

FIG. 6 illustrates the one-dimensional shape of the point spread function when a>0 (see the expression (1)) (i.e., when the point spread function has a given slope). This corresponds to a model when the signal modulation process is performed as illustrated in FIG. 2A or the like. FIG. 5B illustrates the point spread function that indicates blurring when the imaging device or the object has linearly moved at a constant speed in the direction DR1 when a>0.

The following expression (3) is obtained by subjecting the expression (1) to a Fourier transform.

$$H_{slope}(u) = \frac{\sin \pi u}{\pi u} + ja\left(\frac{\sin \pi u}{\pi u}\right)' \quad (3)$$

$$= \frac{\sin \pi u}{\pi u} + ja\left(\frac{\pi u \cos \pi u - \sin \pi u}{\pi u^2}\right)$$

Figure 7:
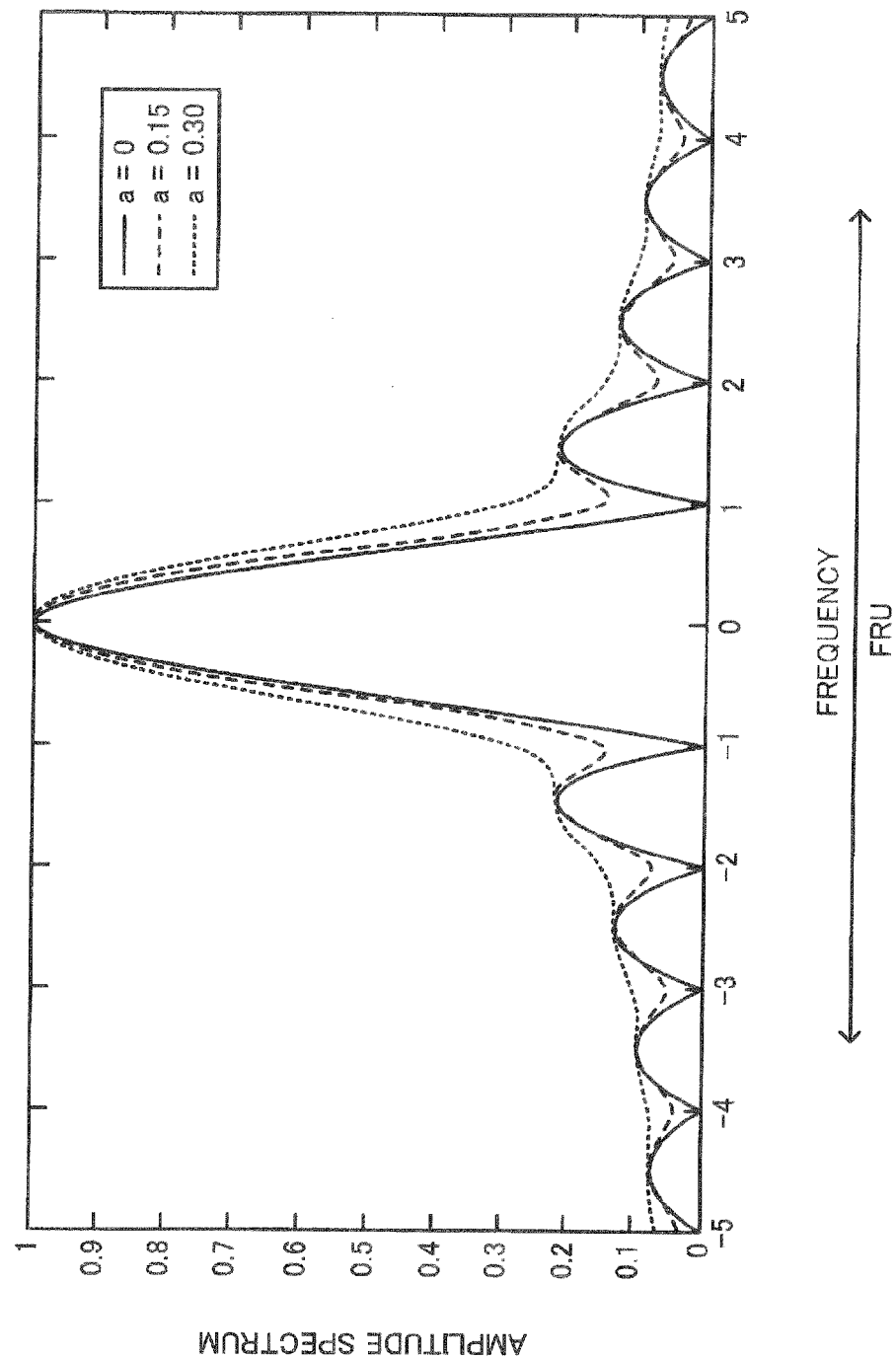
FIG. 7 illustrates the amplitude spectrum of the point spread function illustrated in FIG. 6.

FIG. 7 illustrates a graph in which the amplitude spectrum of the expression (3) is plotted. The amplitude spectrum indicated by the solid line in FIG. 7 is the amplitude spectrum of the point spread function when a=0 (see the expression (1)) (i.e., when the shape of the point spread function is flat). Specifically, the amplitude spectrum indicated by the solid line in FIG. 7 corresponds to FIG. 5A. In this case, the amplitude spectrum has zero points when u=−5, −4, −3, −2, −1, 1, 2, 3, 4, and 5. Therefore, the blur correction process tends to become an ill-posed problem, so that process failure (e.g., an unnatural artifact occurs after the blur correction process) tends to occur. Specifically, process failure occurs when calculating Hinv(u, v)G(u, v) (see FIG. 4B).

The amplitude spectrum indicated by the broken line or the dotted line in FIG. 7 is the amplitude spectrum of the point spread function when the point spread function has a given slope (a=0.15 or a=0.30). Specifically, the amplitude spectrum indicated by the broken line in FIG. 7 corresponds to FIG. 5B. As is clear from FIG. 7, the number of zero points of the amplitude spectrum of the point spread function decreases as the slope of the point spread function increases. This makes it possible to improve the frequency characteristics of the point spread function. As a result, the blur correction process that has been an ill-posed problem becomes a well-posed problem, so that the possibility that process failure occurs when performing the blur correction process decreases.

Although an example in which the point spread function gradually decreases the signal level in a slope manner has been described above, the point spread function may decrease the signal level in a stair-like (stepwise) manner (see FIG. 8), for example.

Figure 8:
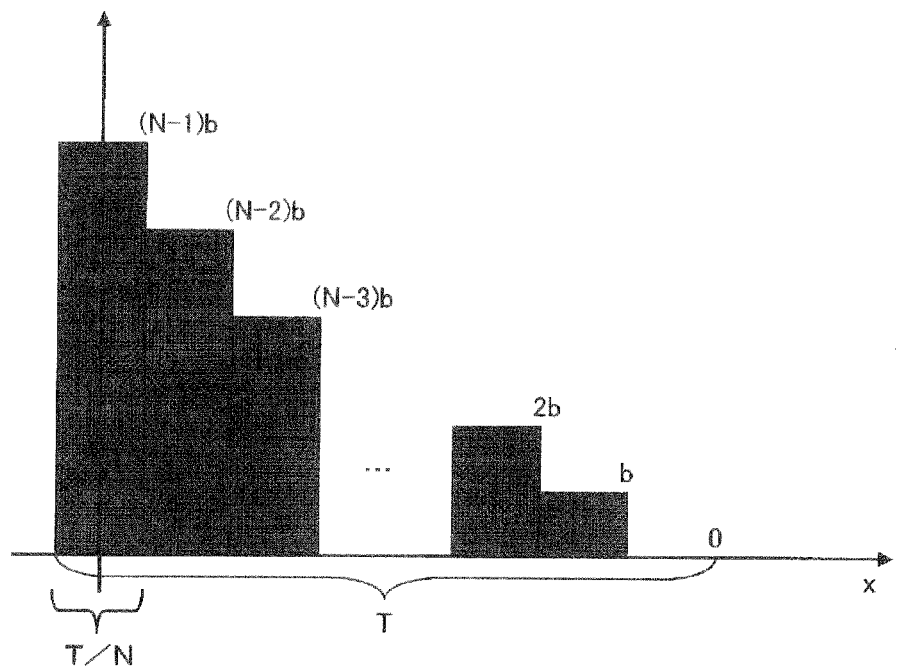
FIG. 8 illustrates a one-dimensional model of a stair-like point spread function.

The stair-like point spread function (PSF) illustrated in FIG. 8 is represented by the following expression (4).

$$h_{stair}(x) = \sum_{n=1}^{N}(Nb-nb)\text{rect}\left(\frac{N}{T}\left(x-\frac{T}{N}(n-1)\right)\right) = \quad (4)$$

$$b\sum_{n=1}^{N}(N-n)\text{rect}\left(\frac{N}{T}x-(n-1)\right)$$

The following expression (5) is obtained by subjecting the expression (4) to a Fourier transform.

$$H_{stair}(u) = b \sum_{n=1}^{N} (N-n) \frac{1}{u} \sin\left(\frac{Tu}{2N}\right) \exp\left(-j(n-1)\frac{T}{N}u\right) \quad (5)$$

Figure 9:
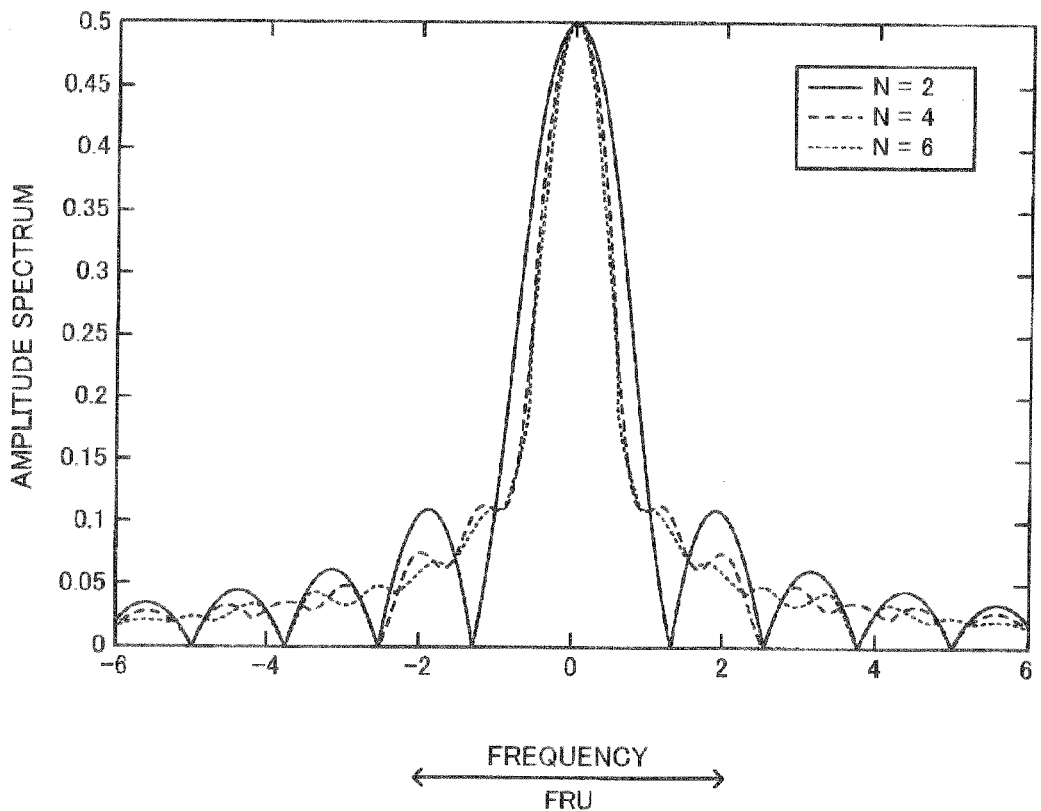
FIG. 9 illustrates the amplitude spectrum of the point spread function illustrated in FIG. 8.

FIG. 9 illustrates a graph in which the amplitude spectrum of the expression (5) is plotted. Note that T=10 (pixels), N=2, 4, or 6 (three types), and b=2/((N−1)T).

The amplitude spectrum indicated by the solid line in FIG. 9 is the amplitude spectrum of the point spread function when N=2 (i.e., when the shape of the point spread function is flat) (i.e., when the point spread function has the shape of a mere rect function). The amplitude spectrum has a larger number of zero points in the low frequency region when N=2 as compared with the case when N=4 or N=6. Therefore, the blur correction process tends to become an ill-posed problem, so that process failure (e.g., an unnatural artifact occurs after the blur correction process) tends to occur.

The amplitude spectrum indicated by the broken line or the dotted line in FIG. 9 is the amplitude spectrum of the point spread function when the point spread function has a given stair-like shape. Specifically, the broken line indicates the case where the point spread function has a three-step stair-like shape, and the dotted line indicates the case where the point spread function has a five-step stair-like shape. As is clear from FIG. 9, the number of zero points of the amplitude spectrum of the point spread function decreases as the number of steps of the stair-like shape of the point spread function increases (as the value N increases). This makes it possible to improve the frequency characteristics of the point spread function. As a result, the blur correction process that has been an ill-posed problem becomes a well-posed problem, so that the possibility that process failure occurs when performing the blur correction process decreases.

The signal modulation method according to one embodiment of the invention can thus decrease the number of zero points of the amplitude spectrum of the point spread function in the usage frequency range (i.e., a frequency range necessary for the spatial frequency of the captured image). In FIG. 7, when the usage frequency range of the imaging device is referred to as FRU, the number of zero points in the usage frequency range FRU is 6 when the signal level is not decreased or increased (i.e., when a=0). In contrast, the number of zero points in the usage frequency range FRU is 0 when the signal modulation process that decreases (or increases) the signal level is performed (see FIG. 6) (i.e., when a=0.15 or a=0.30).

In FIG. 9, the number of zero points in the usage frequency range FRU is 2 when N=2. In contrast, the number of zero points in the usage frequency range FRU is 0 when the signal modulation process that decreases (or increases) the signal level is performed (see FIG. 8) (i.e., when N=4 or N=6).

It is possible to suppress occurrence of an ill-posed problem, and decrease the possibility that process failure occurs when performing the blur correction process by thus decreasing the number of zero points in the usage frequency range.

3. Control of Aperture

Various signal modulation process control methods according to one embodiment of the invention are described below. In one embodiment of the invention, the control section 40 illustrated in FIG. 1A controls the imaging section 10 in order to implement the signal modulation process as illustrated in FIGS. 2A to 3D. More specifically, the control section 40 controls the optical system 12 (aperture 16 and shutter 18), the image sensor 20, the lighting section 30, and the like included in the imaging section 10 so that the signal modulation process that decreases or increases the signal level of the image signal is performed during the exposure period. For example, the control section 40 gradually closes or opens the aperture 16 of the optical system 12 during the exposure period. When the optical system 12 includes the shutter 18 for which the light transmittance is variably set, the control section 40 gradually decreases or increases the light transmittance of the shutter 18 during the exposure period. Alternatively, the control section 40 gradually decreases or increases the irradiation intensity of light emitted from the lighting section 30 during the exposure period, or controls the image sensor 20 included in the imaging section 10 so that the signal modulation process that gradually decreases or increases the signal level of the image signal is performed during the exposure period.

The signal level is decreased using the aperture 16 by gradually closing the aperture 16 during the exposure period from the exposure start timing ts to the exposure end timing to during the imaging operation (see FIG. 10A). This makes it possible to improve the frequency characteristics of the point spread function during the imaging operation as described above with reference to FIGS. 6, 7, and the like, so that the blur correction process is appropriately performed by the blur correction section 52 in the subsequent stage. The aperture 16 may be closed at an arbitrary speed or an arbitrary acceleration.

Note that the frequency characteristics of the point spread function during the imaging operation may be improved by gradually opening the aperture 16, differing from FIG. 10A. The aperture 16 may be closed or opened at a given acceleration. It is possible to decrease or increase the signal level of the image signal in various ways by closing or opening the aperture 16 in a different way.

Note that the method that gradually closes the aperture 16 during the exposure period has an advantage over the method that gradually opens the aperture 16 during the exposure period in that the quantity of light incident on the image sensor 20 at the exposure start timing ts increases, so that it is possible to implement an imaging operation that more appropriately reflects the imaging timing instructed by the user.

4. Control of Shutter

The signal level is decreased using the shutter 18 by gradually decreasing the light transmittance (i.e., gradually increasing the opacity) of the shutter 18 during the exposure period from the exposure start timing ts to the exposure end timing to during the imaging operation (see FIG. 10B). For example, a liquid crystal shutter or the like for which the light transmittance is variably set is used as the shutter 18, and the transmittance of the liquid crystal shutter or the like is controlled. This makes it possible to improve the frequency characteristics of the point spread function during the imaging operation as described above with reference to FIGS. 6, 7, and the like, so that the blur correction process is appropriately performed by the blur correction section 52 in the subsequent stage. The transmittance of the shutter 18 may be gradually decreased at an arbitrary speed or acceleration.

Note that the frequency characteristics of the point spread function during the imaging operation may be improved by gradually increasing the transmittance of the shutter 18, differing from FIG. 10B. The shutter 18 is not limited to a liquid crystal shutter. For example, two polarizers may be provided, and the transmittance of light that passes through the shutter 18 may be controlled by gradually rotating one of the polarizers to decrease or increase the signal level of the image signal. Alternatively, a mechanical shutter may be used as the shutter 18, and the signal modulation process according to one embodiment of the invention may be implemented by gradually closing the mechanical shutter, for example.

5. Control of Lighting Section

The signal level is decreased using the lighting section 30 by gradually decreasing the irradiation intensity of light emitted from the lighting section 30 during the exposure period from the exposure start timing is to the exposure end timing to (see FIG. 10B). For example, the irradiation intensity of light emitted from an LED light or a flash that forms the lighting section 30 is gradually decreased. The irradiation intensity of light emitted from an LED light may be controlled by controlling a current that flows through the LED (light-emitting device). This makes it possible to improve the frequency characteristics of the point spread function during the imaging operation as described above with reference to FIGS. 6, 7, and the like, so that the blur correction process is appropriately performed by the blur correction section 52 in the subsequent stage.

Note that the imaging operation may be performed while gradually increasing the irradiation intensity of light emitted from the lighting section 30 during the exposure period, differing from FIG. 10B.

6. Control of Image Sensor

In one embodiment of the invention, the control section 40 may control the image sensor 20 included in the imaging section 10 so that the signal modulation process that gradually decreases or increases the signal level of the image signal is performed during the exposure period. For example, the control section 40 may gradually decrease or increase a period from the charge storage start timing to the charge transfer timing of the image sensor 20. Alternatively, the control section 40 may gradually decrease or increase the signal gain of a charge that is stored in and transferred from the image sensor 20.

Figure 11A:
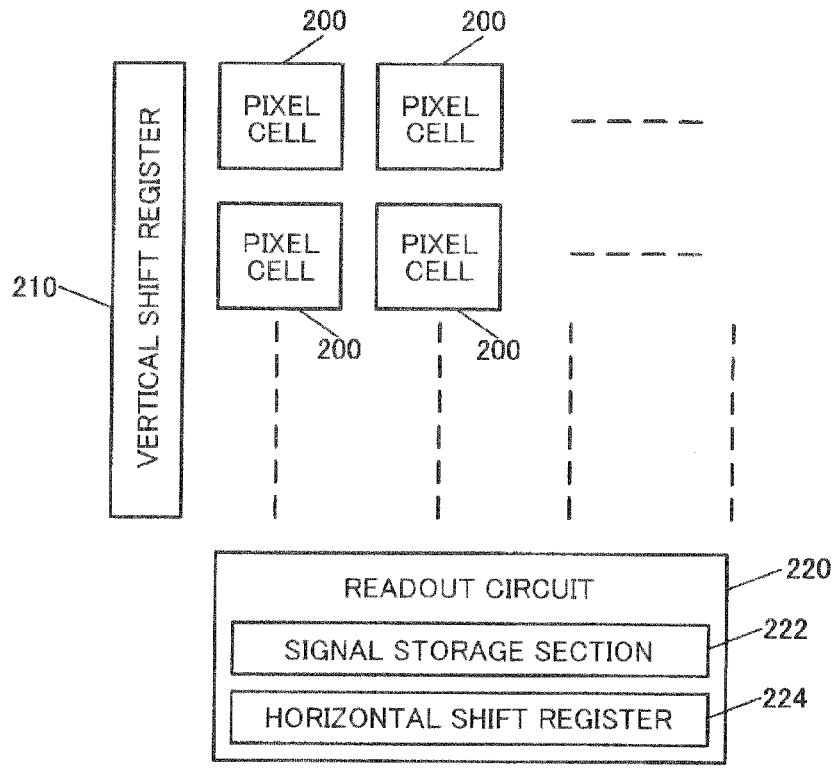
FIGS. 11A and 11B illustrate a configuration example of an image sensor.

FIG. 11A illustrates a configuration example of the image sensor 20 when the image sensor 20 is a CMOS sensor. The image sensor 20 includes a plurality of pixel cells 200 disposed in a matrix, a vertical shift register 210 that selects the row of the pixel cells 200, and a readout circuit 220 that reads signals from the pixel cells 200. The readout circuit 220 includes a signal storage section 222 that stores the signals read from the pixel cells 200, and a horizontal shift register 224 that selects the column of the pixel cells 200.

Figure 11B:
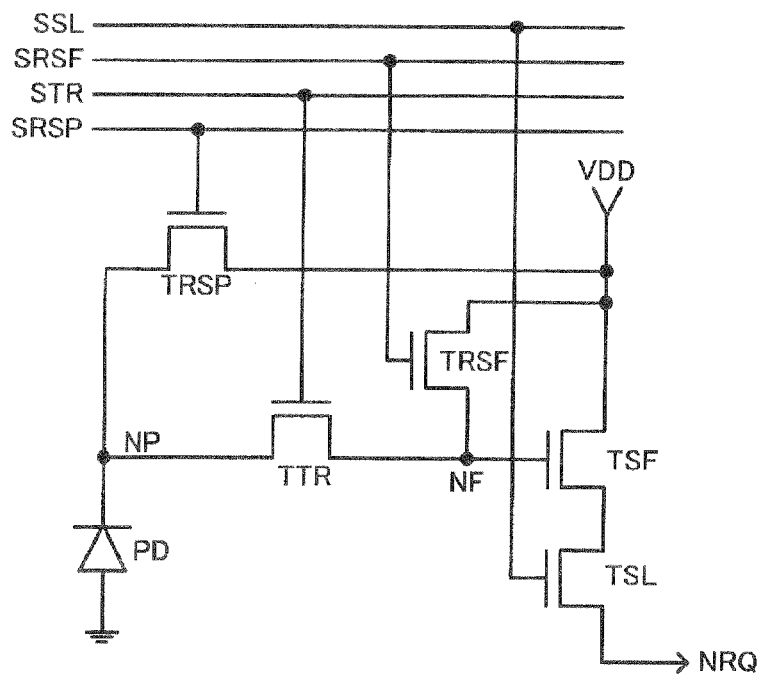

FIG. 11B illustrates a configuration example of each pixel cell 200 (pixel circuit) included in the image sensor 20. The pixel cell 200 includes a photodiode PD (light-receiving device) and transistors TRSP, TTR, TRSF, TSF, and TSL.

The transistor TRSP is a transistor (switch) for resetting the photodiode PD. The transistor TTR is a transistor for controlling the charge transfer timing of charge transfer to a floating diffusion region (node NF). The transistor TRSF is a transistor for resetting the floating diffusion region (NF). The transistor TSF is a transistor for performing a source follower operation. The transistor TSL is a transistor for selecting the readout target pixel cell, and outputting a signal to an output node NRQ.

Control signals SRSP, STR, SRSF, and SSL are respectively input to the gate of the transistors TRSP, TTR, TRSF, and TSL. The node NF (floating diffusion region) is connected to the gate of the transistor TSF. The transistor TRSP is provided between a VDD node (high-potential-side power supply node) and a charge storage node NP, and the transistor TTR is provided between the node NF (floating diffusion region) and the charge storage node NP. The transistor TRSF is provided between the VDD node and the node NF, and the transistors TSF and TSL are provided in series between the VDD node and an output node NRQ.

The control section 40 reduces the amount of charge acquired during photoelectric conversion by controlling the transistors TRSP, TTR, TRSF, and TSL, and the like to decrease the signal level of the image signal. Note that the configurations of the image sensor 20 and the pixel cell 200 are not limited to the configurations illustrated in FIGS. 11A and 11B. Various modifications may be made, such as omitting some of the elements or adding other elements.

The operation of the image sensor 20 illustrated in FIGS. 11A and 11B is described in detail below using the operation timing diagram illustrated in FIG. 12.

Figure 12:
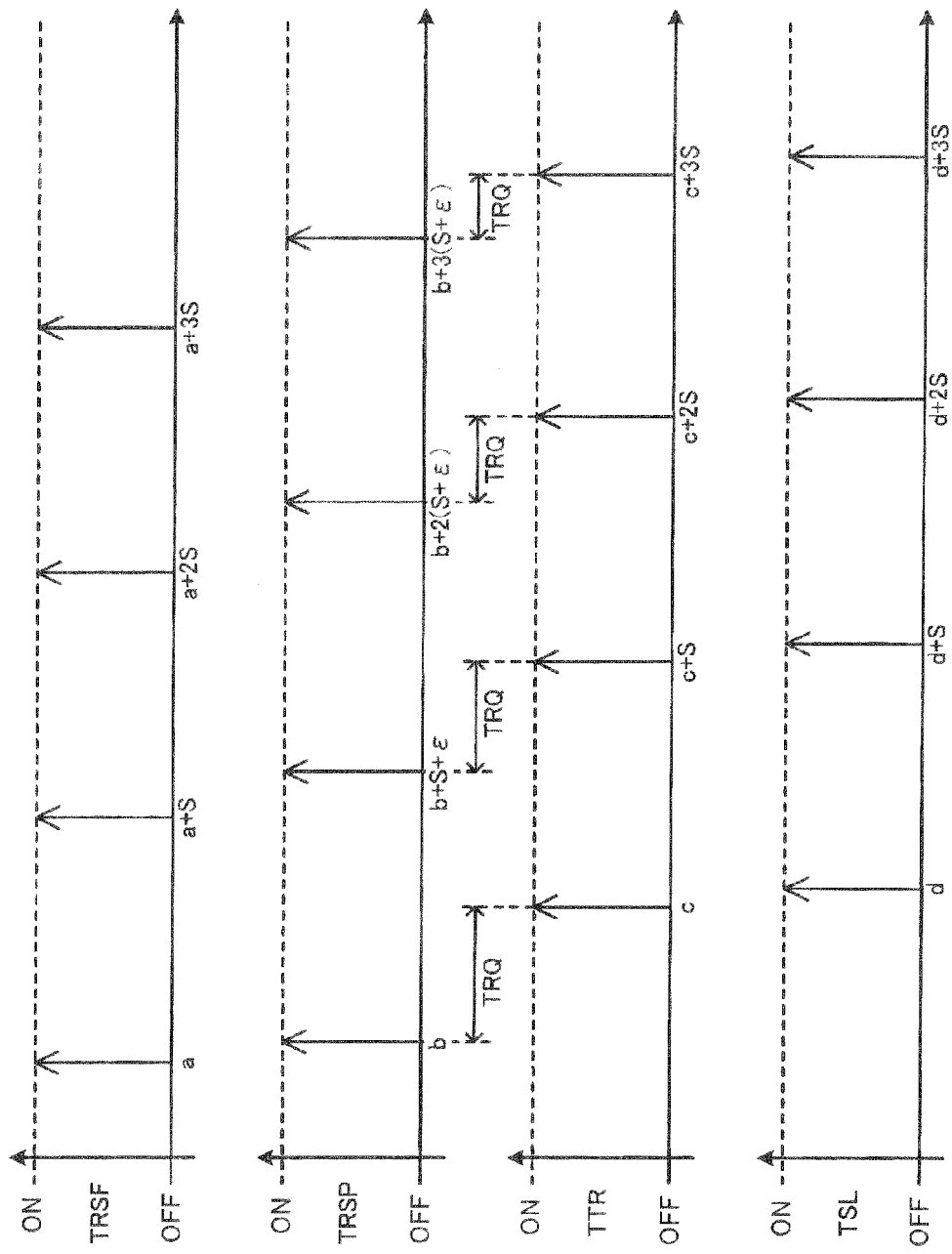
FIG. 12 is an operation timing diagram illustrating the operation of an image sensor.

The transistor TRSF is turned ON at a timing a in FIG. 12, so that the node NF (floating diffusion region) is set at a reset voltage (VDD), and the gate of the source follower transistor TSF is also set at the reset voltage.

The transistor TRSP is turned ON at a timing b, so that the charge storage node NP is set at the reset voltage (VDD). The photodiode PD is thus reset, and a charge is stored in the charge storage node NP due to the photoelectric effect of the photodiode PD.

The transistor TTR is turned ON at a timing c when the desired storage time has elapsed, so that the charge stored due to the photodiode PD is transferred from the charge storage node NP to the node NF (floating diffusion region) (input node of the transistor TSF).

The transistor TSL is turned ON at a timing d, so that a signal of an optical signal component that corresponds to the charge stored in the node NF (floating diffusion region) is output to the output node NRQ. The signal of the optical signal component is stored in a frame buffer or the like.

In one embodiment of the invention, the imaging operation of the image sensor 20 (CMOS sensor) is implemented by repeatedly causing the reset transistors TRSF and TRSP to be turned ON while shifting the ON timings.

As illustrated in FIG. 12, the transistor TRSF for resetting the floating diffusion region is turned ON at the timings a, a+S, a+2S, and a+3S. The transistor TRSF for resetting the photodiode PD is turned ON at the timings b, b+(S+ε), b+2 (S+ε), and b+3(S+ε).

The transfer transistor TTR is turned ON at the timings c, c+S, c+2S, and c+3S. The selection transistor TSL is turned ON at the timings d, d+S, d+2S, and d+3S. The signals of the optical signal component obtained by the repeated operation are read via the output node NRQ, and added up in the frame buffer.

When the operation of the image sensor 20 is controlled as described above, a period TRQ from the timing (b, b+(S+ε), b+2(S+ε), . . . ) at which the photodiode PD is reset by the transistor TRSP to the timing (c, c+S, c+2S, . . . ) at which the stored charge is transferred by the transistor TTR is c−b−nε (n=1, 2, 3, . . . , N). Therefore, the period TRQ (=c−b−nε) gradually decreases as the value n increases. Note that N (i.e., total number of repetitions) is a natural number that satisfies "Nε<c−b".

It is possible to implement the signal modulation process that gradually decreases (or increases) the signal level of the image signal (decreases (or increases) the signal level of the image signal in a stair-like manner) (see FIG. 8, for example) by thus gradually decreasing (or increasing) the period TRQ from the charge storage start timing to the charge transfer timing of the image sensor 20.

Note that the signal modulation method implemented by controlling the image sensor 20 may be modified in various ways. For example, each pixel cell of the image sensor 20 may be configured as illustrated in FIG. 13, and the signal gain of a charge that is stored in and transferred from the image sensor 20 may be gradually decreased (or increased).

Figure 13:
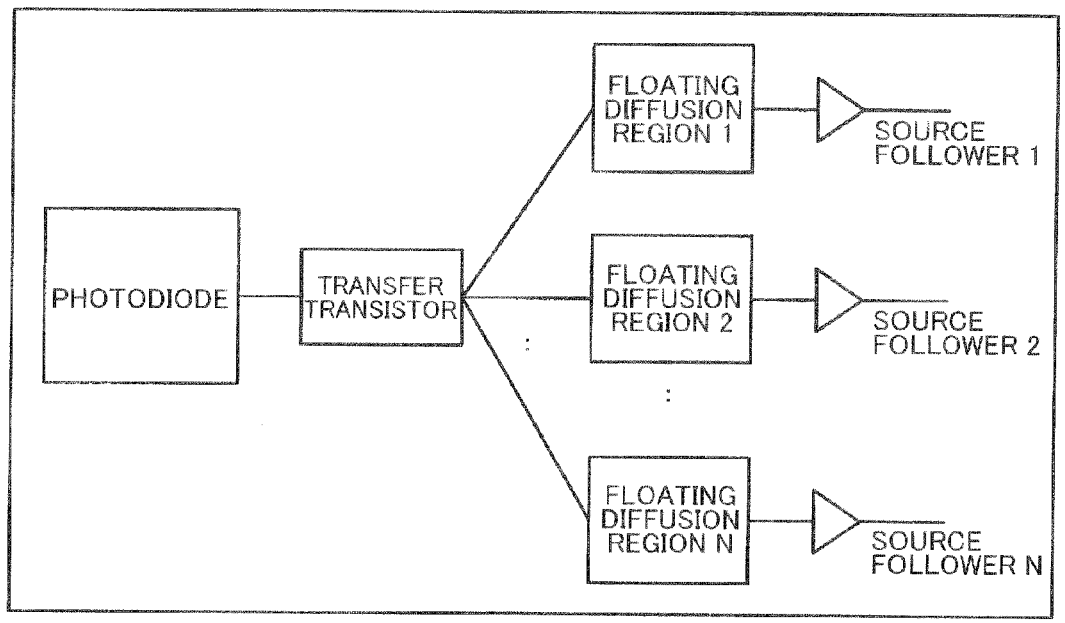
FIG. 13 is a view illustrating another example of a signal modulation process that is implemented by controlling an image sensor.

In FIG. 13, a plurality of floating diffusion regions are provided corresponding to one photodiode. The exposure period from the start of exposure to the end of exposure during the imaging operation is divided into a plurality of periods, and a charge is stored in each floating diffusion region via the transfer transistor in each of the plurality of periods. For example, the exposure period from the start of exposure to the end of exposure during the imaging operation is divided into N periods. A charge stored in the photodiode in the Sth period (S=1, 2, 3, . . . , N) is transferred to the Sth floating diffusion region (S=1, 2, 3, . . . , N). The signal level of the image signal is gradually decreased by changing the gain of the source follower on the floating diffusion region basis. More specifically, when transferring a charge stored in the photodiode in the Sth period (S=1, 2, 3, . . . , N) to the Sth floating diffusion region, the gain of the source follower connected to the floating diffusion region is gradually decreased as the value S increases. The charge stored in each floating diffusion region is added up, and read from the image sensor 20 as the image signal of one pixel cell.

Although an example in which the signal level is gradually decreased has been described above, the signal level may be gradually increased by gradually increasing the gain of the source follower.

7. Blur Correction Process

The blur correction process, the blur correction possibility determination process, and the blur correction success/failure determination process are described in detail below.

An image captured by the imaging section 10 illustrated in FIG. 1A is recorded (stored) in the recording section 60. The image recorded (stored) in the recording section 60 is transferred to the blur correction possibility determination section 54. The user may designate the transfer timing via a user interface of the imaging device, or the image may be automatically transferred to the blur correction possibility determination section 54 when the image has been recorded in the recording section 60. The blur correction possibility determination section 54 determines whether or not the blurred image can be corrected.

More specifically, the blur correction possibility determination section 54 calculates the size of the point spread function of the blurred image, and determines whether or not the blurred image can be corrected based on the size of the point spread function. When using such a method, the subsequent process is not performed when a non-blurred image has been transferred.

For example, when a sensor (blur detection section) that detects the motion of the imaging device is provided in the imaging device, the blur correction possibility determination section 54 determines whether or not the blur correction process is possible based on sensor information from the sensor. For example, the blur correction possibility determination section 54 calculates the size of the point spread function based on the sensor information, and determines whether or not the captured image can be corrected. A motion sensor such as an angular velocity sensor or an acceleration sensor may be used as the sensor that detects the motion of the imaging device. For example, movement data about the imaging device in the X, Y, and Z directions may be acquired based on the sensor information from the motion sensor, and whether or not the blur correction process is possible may be determined based on the acquired movement data.

The blur correction possibility determination section 54 may estimate the point spread function from the blurred image represented by the image signal subjected to the signal modulation process, and may determine whether or not the blur correction process is possible based on the estimated point spread function.

Note that the blur correction possibility determination method is not limited to the above methods, and various other methods may be used as long as it is possible to determine whether or not the blurred image can be corrected (i.e., whether or not the blur correction process is possible). For example, it may be determined that the blur correction process is impossible when it has been determined that the number of zero points is large from the analyzed frequency characteristics of the actually calculated point spread function, and the blur correction process may not be performed.

An example of the point spread function estimation process is described below. The point spread function may be estimated by performing a process that minimizes an energy function E (see the following expression (6)) on the non-blurred original image and the point spread function.

$$E(h,f) = \|g - hf\|_2^2 + \|Lf\|_2^2 + \|h\|_1 \quad (6)$$

where, g is matrix representation of the blurred image, h is matrix representation of the point spread function, f is matrix representation of the non-blurred original image, and L is matrix representation of a Laplacian filter. hf indicates an operation that convolutes the point spread function with the non-blurred original image, and Lf indicates an operation that convolutes the Laplacian filter with the non-blurred original image. Note that the thick letter in the expression (6) and the like indicates a vector. The norm (L1 norm and L2 norm) of an arbitrary vector x used in the expression (6) is defined by the following expression.

$$\|x\|_p := \left(\sum_{i=1}^{n} |x_i|^p\right)^{1/p} = \sqrt[p]{|x_1|^p + \ldots + |x_n|^p} \quad (7)$$

where, P=1 or 2.

The point spread function h is estimated by minimizing the energy function E (see the expression (6)) by changing the point spread function h and the original image f before blurring occurs.

An example of a specific method that estimates the point spread function h using the energy function E is described below.

(A1) The initial value of the point spread function is determined. For example, an impulse function point spread function or the like is set as the initial point spread function. Alternatively, the user may designate the length and the direction of linear blurring as the initial value of the point spread function via a user interface (e.g., touch panel). Alternatively, the user may draw a point spread function having an arbitrary shape via a user interface (e.g., touch panel) to set the point spread function having an arbitrary shape as the initial value.

(A2) The value of the point spread function is fixed using the initial value of the point spread function that has been set in the step (A1), and the energy function E represented by the following expression (8) is minimized using the non-blurred original image as a variable to calculate the non-blurred original image.

$$E(f) = \|g - hf\|_2^2 + \|Lf\|_2^2 \quad (8)$$

The energy function E is minimized using a convex analysis method (e.g., steepest descent method or Newton's method).

(A3) The value of the non-blurred original image calculated by the step (A2) is fixed, and the energy function E represented by the following expression (9) is minimized using the value of the point spread function as a variable to calculate the point spread function. The energy function E is minimized using a convex analysis method (e.g., steepest descent method or Newton's method).

$$E(h) = \|g - hf\|_2^2 + \|h\|_1 \quad (9)$$

(A4) The non-blurred original image and the point spread function are calculated with higher accuracy by repeating the steps (A2) and (A3). Note that the above repetition process may be omitted in order to reduce the amount of calculations.

The point spread function and the non-blurred original image can thus be calculated.

When the blur correction possibility determination section 54 has determined that the blur correction process is possible, the blurred image is transferred to the blur correction section 52. The blur correction section 52 performs the blur correction process on the blurred image.

The blur correction section 52 performs the blur correction process using an inverse filter, the Wiener filter, the Richardson-Lucy method, or the like. It is necessary to calculate the point spread function in advance in order to perform the blur correction process. The point spread function may be estimated by the energy function E minimization method (see the expression (4)) used by the blur correction possibility determination section 54. Therefore, when the blur correction possibility determination section 54 has estimated the point spread function, the blur correction section 52 may use the point spread function estimated by the blur correction possibility determination section 54.

A specific example of the blur correction process is described below. The following example illustrates the case where the blur correction process is performed using an inverse filter or the Wiener filter. For example, the blur correction process using the inverse filter may be implemented by performing the calculations represented by the following expression (10).

$$f_{inv} = ifft\left(\frac{G}{H}\right) \quad (10)$$

where, ifft is an inverse Fourier transform, finv is the non-blurred image estimated using the inverse filter, G is the blurred image subjected to a Fourier transform, and H is the point spread function subjected to a Fourier transform.

The blur correction process using the Wiener filter may be implemented by performing the calculations represented by the following expression (11).

$$f_{wiener} = ifft\left(\frac{H'G}{H'H + K}\right) \quad (11)$$

where, H' is the complex conjugate of a Fourier transform coefficient H, fwiener is the non-blurred image estimated using the Wiener filter, and K is an arbitrary constant. Note that the constant K may change corresponding to the frequency.

Note that the non-blurred original image that has been estimated by the blur correction possibility determination section 54 when estimating the point spread function may also be used.

The blur correction process may be implemented using various methods other than the above methods. For example, the blur correction process may be implemented using the method described in High-quality Motion Deblurring from a Single Image SIGGRAPH 2008.

The blurred image that has been subjected to the blur correction process by the blur correction section 52 is transferred to the blur correction success/failure determination section 56. The blur correction success/failure determination section 56 presents the blurred image subjected to the blur correction process to the user, and instructs the user to determine whether the blur correction process has been appropriately performed, for example. When performing the blur correction process using the energy function E minimization method (see the expression (4)), it may be determined that the blur correction process has not been appropriately performed when the final value of the energy function E is larger than a given value.

When the blur correction success/failure determination section 56 has determined that the image has been appropriately corrected by the blur correction section 52, the image subjected to the blur correction process is transferred to and recorded (stored) in the recording section 60. The image recorded (stored) in the recording section 60 is used for various applications through the input/output section 70.

According to one embodiment of the invention, the blur correction section 52 estimates the point spread function from the blurred image, and performs the blur correction process that calculates the non-blurred original image based on the estimated point spread function and the blurred image.

Figure 14:
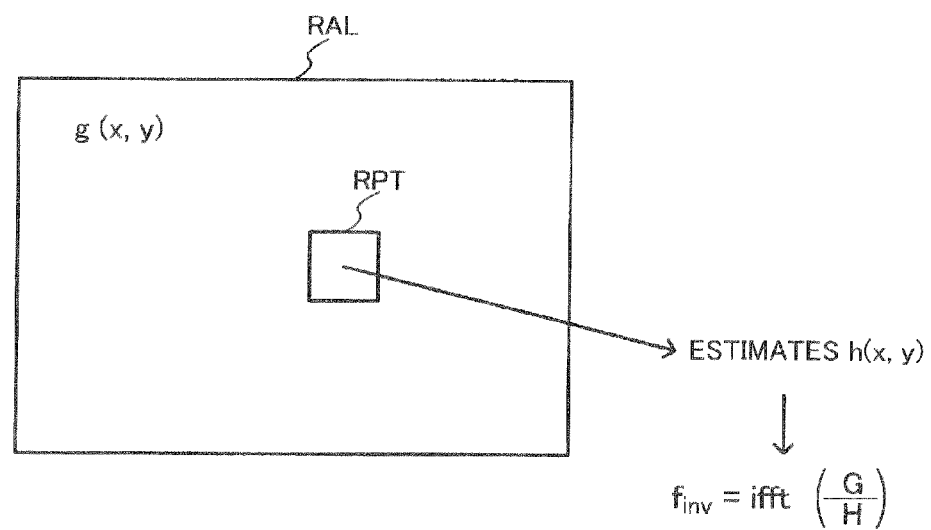
FIG. 14 is a view illustrating a method that restores the original image based on an estimated point spread function.

As illustrated in FIG. 14, the blur correction section 52 may perform the blur correction process that calculates the original image of an entire image area RAL based on the point spread function h estimated within an image area RPT that is smaller than the entire image area RAL.

Specifically, when calculating the original image f by an inverse Fourier transform from the Fourier transform G of the blurred image g and the Fourier transform H of the point spread function h (see the expressions (10) and (11)), the processing load may increase when the original image f (finv or fwiener) is restored by calculating the Fourier transform H of the point spread function h over the entire image area RAL.

It is considered that the point spread function in which shake of the imaging device is the main image deterioration factor, does not locally differ between the image areas (i.e., has a constant shape).

Therefore, the point spread function h within the desired image area RPT in FIG. 14 is estimated by the method (energy function E minimization method using the expressions (6) and the like) that includes the steps (A1) to (A4), for example. A high-contrast area, an area that has a large amount of edge components, or the like is set as the image area RPT for estimating the point spread function h, and the point spread function h is estimated using the image within the image area RPT. This makes it possible to estimate the point spread function h using the image that reflects the shake of the imaging device, so that the estimation accuracy can be improved.

The Fourier transform H of the estimated point spread function h is calculated, and substituted in the expression (10)

or (11) (subjected to an inverse Fourier transform) to restore the original image f. This makes it possible to restore the original image f while reducing the processing load.

The blur correction possibility determination section 54 determines whether the blur correction process performed by the blur correction section 52 is possible. More specifically, the blur correction possibility determination section 54 estimates the point spread function h from the blurred image g (i.e., the image represented by the image signal subjected to the signal modulation process) (see (A1) to (A4)), and determines whether or not the blur correction process is possible based on the estimated point spread function h.

In this case, it is useless if the blur correction section 52 estimates the point spread function h again when performing the blur correction process.

Therefore, the blur correction section 52 performs the blur correction process that calculates the non-blurred original image using the point spread function h that has been estimated by the blur correction possibility determination section 54. This makes it possible to prevent a situation in which unnecessary processing is performed, so that the processing efficiency can be improved.

When the blur correction possibility determination section 54 has determined that the blur correction process is possible, the image obtained by the blur correction process is stored in the recording section 60 (storage section) as the captured image. More specifically, when the blur correction possibility determination section 54 has determined that the blur correction process is possible, and the blur correction success/failure determination section 56 has determined that the blur correction process has succeeded, the image obtained by the blur correction process is stored in the recording section 60.

When the blur correction possibility determination section 54 has determined that the blur correction process is impossible, the image that is not subjected to the blur correction process is stored in the recording section 60 as the captured image. When the blur correction success/failure determination section 56 has determined that the blur correction process has failed, the image that is not subjected to the blur correction process is also stored in the recording section 60 as the captured image.

Specifically, when using the coding method (e.g., shutter flutter method or coded aperture method) employed in the related-art examples, the image that is not subjected to the blur correction process becomes unnatural due to the coding process. Therefore, a natural image can be presented to the user when the blur correction possibility determination section 54 has determined that the blur correction process is impossible, or the blur correction success/failure determination section 56 has determined that the blur correction process has failed.

According to one embodiment of the invention, only the simple signal modulation process as illustrated in FIGS. 2A to 3D has been performed on the image that has not been subjected to the blur correction process. Therefore, it is possible to present the captured image stored in the recording section 60 to the user even when the blur correction possibility determination section 54 has determined that the blur correction process is impossible, or the blur correction success/failure determination section 56 has determined that the blur correction process has failed, by storing the image that is not subjected to the blur correction process in the recording section 60 as the captured image.

8. Process Flow

The process flow according to one embodiment of the invention is described below using the flowcharts illustrated in FIGS. 15 and 16.

Figure 15:
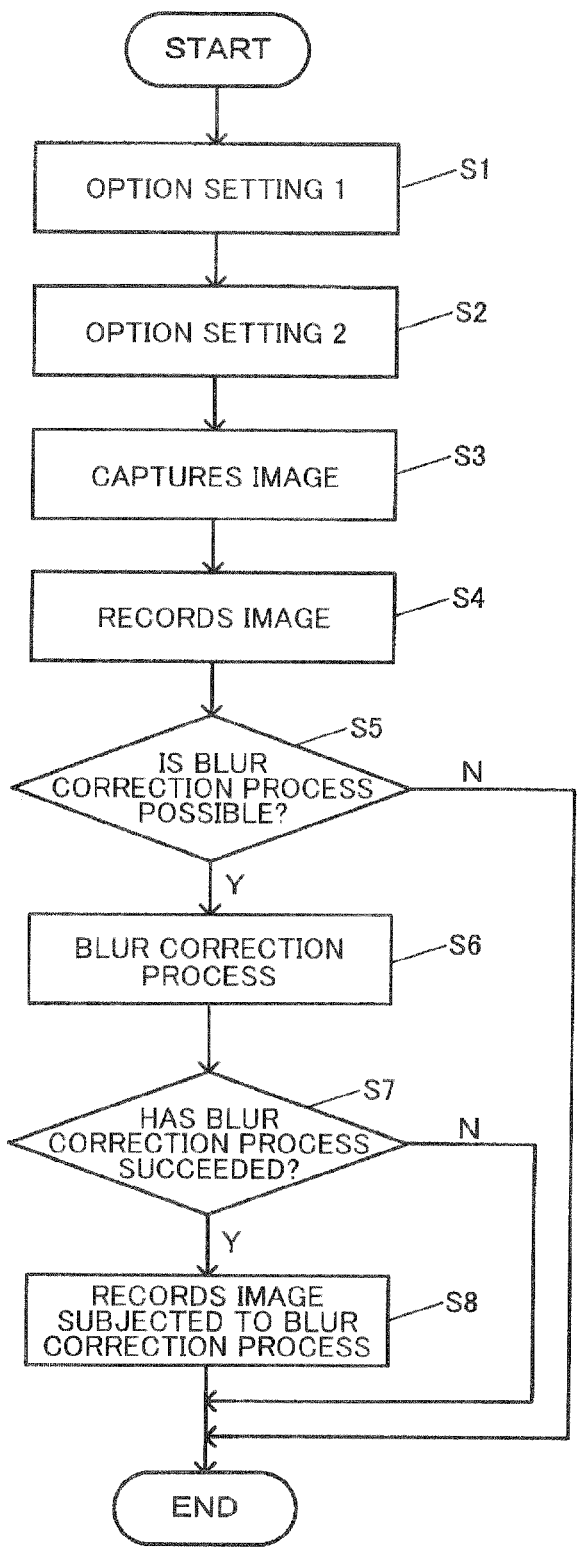
FIG. 15 is a flowchart illustrating the operation according to one embodiment of the invention.

In a step S1 in FIG. 15, an imaging option setting process is performed (option setting 1). For example, the option setting process is performed by the user via the user interface of the imaging device.

More specifically, the user performs an aperture (16) control ON/OFF setting, a shutter (18) control ON/OFF setting, an image sensor (20) control ON/OFF setting, and a lighting section (30) control ON/OFF setting.

When setting the shutter speed, and controlling the aperture 16, the initial aperture value when controlling the aperture 16, the operation period of the aperture 16 during the imaging operation, the locus of the aperture 16, and the like are set as parameters.

When controlling the shutter 18, the initial transmittance (opacity) when controlling the shutter 18, the operation period of the shutter 18 during the imaging operation, the locus of the transmittance of the shutter 18, and the like are set as parameters.

When controlling the image sensor 20, the operation period of the image sensor 20, the signal readout count (N) during the imaging period, the photodiode reset timing control parameter (s), and the like are set as parameters.

When controlling the lighting section 30, the initial light intensity when controlling the lighting section 30, the operation period of the lighting section 30 during the imaging operation, the locus of the light intensity of the lighting section 30, and the like are set as parameters.

Note that these parameter values may be classified corresponding to the mode, and presented to and selected by the user.

In a step S2, the mode is set to a first mode that gradually decreases the signal level of the image signal acquired during the imaging operation, or a second mode that gradually increases the signal level of the image signal acquired during the imaging operation (option setting 2).

In a step S3, the imaging section 10 included in the imaging device starts the imaging operation. When the first mode that gradually decreases the signal level of the image signal has been selected in the step S2, the imaging operation is performed in the step S3 so that the signal level of the image signal gradually decreases. More specifically, when the aperture control option has been set to ON in the step S1, the imaging operation is performed while gradually closing the aperture 16. When the shutter control option has been set to ON in the step S1, the imaging operation is performed while gradually decreasing the transmittance of the shutter 18 (gradually closing the shutter 18). When the image sensor control option has been set to ON in the step S1, the imaging operation is performed while gradually decreasing the amount of charge stored in the image sensor 20 (gradually decreasing the charge transfer period or gain). When the lighting section control option has been set to ON in the step S1, the imaging operation is performed while gradually decreasing the irradiation intensity of light emitted from the lighting section 30.

When the second mode that gradually increases the signal level of the image signal has been selected in the step S2, the imaging operation is performed in the step S3 so that the signal level of the image signal gradually increases. More specifically, when the aperture control option has been set to ON in the step S1, the imaging operation is performed while gradually opening the aperture 16. When the shutter control option has been set to ON in the step S1, the imaging operation is performed while gradually increasing the transmittance of the shutter 18 (gradually opening the shutter 18). When the image sensor control option has been set to ON in the step S1, the imaging operation is performed while gradually increasing the amount of charge stored in the image sensor 20 (gradually increasing the charge transfer period or gain). When the lighting section control option has been set to ON in the step S1, the imaging operation is performed while gradually increasing the irradiation intensity of light emitted from the lighting section 30.

A specific example of the process performed in the step S3 in FIG. 15 is described below using the flowchart illustrated in FIG. 16. FIG. 16 is a flowchart when the signal modulation process is performed using the aperture 16 (see FIG. 10A).

Figure 16:
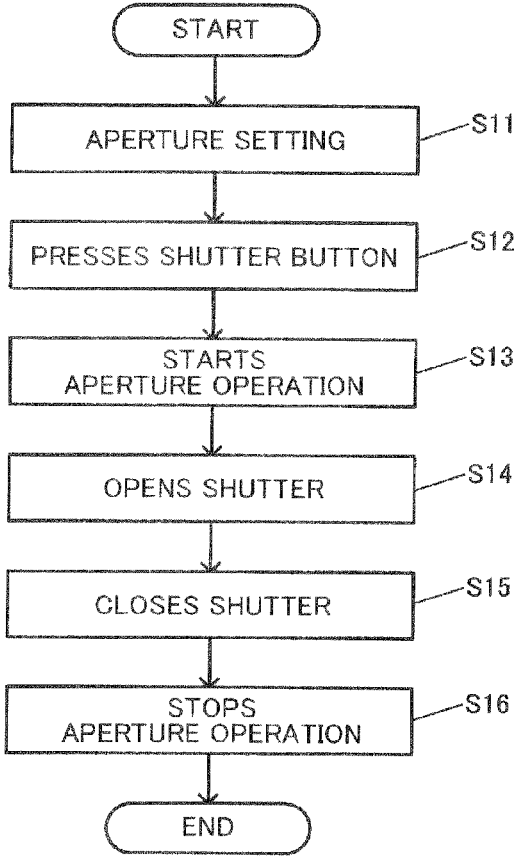
FIG. 16 is a flowchart illustrating a signal modulation process that is implemented by controlling an aperture.
Figure 17:
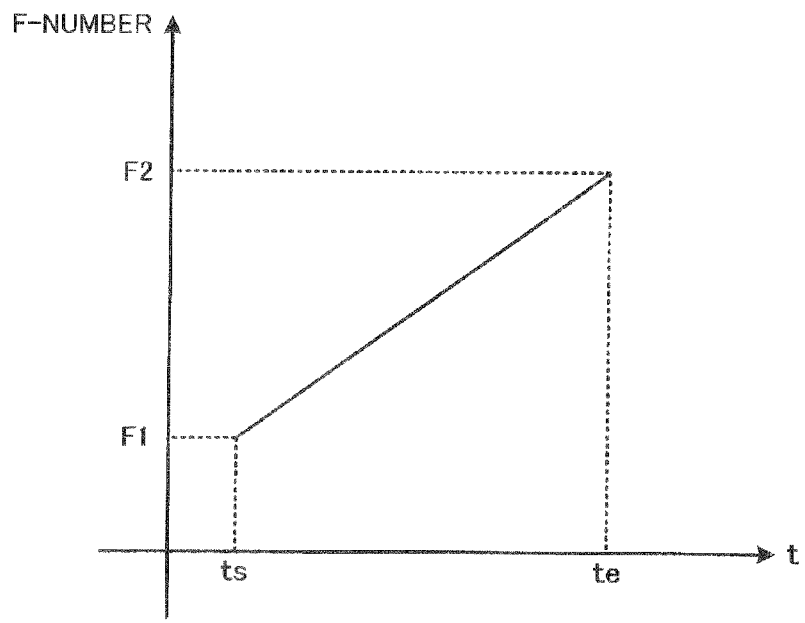
FIG. 17 is a view illustrating a signal modulation process that is implemented by controlling an aperture.

In a step S11 in FIG. 16, the aperture 16 is set to the initial aperture value set in the step S1 in FIG. 15. Specifically, the F-number is set to F1 at the time ts in FIG. 17.

When the user has pressed the shutter button in a step S12, the aperture operates in a step S13. In this case, the F-number is set to a value that corresponds to the time t in FIG. 17. The aperture value is controlled in accordance with the locus of the aperture 16 set in the step S1 in FIG. 15.

The shutter opens in a step S14. The shutter closes in a step S15 after the end of exposure to complete the imaging operation. The aperture operation ends in a step S16. In this case, the F-number is set to F2 at the time te. The operation period T (=ts−te) of the aperture 16 is set to the operation period of the aperture 16 set in the step S1 in FIG. 15.

Note that the step S13 and the step S14 may be performed in reverse order. The step S15 and the step S16 may also be performed in reverse order.

The imaging section 10 operates as described above when controlling the aperture 16.

Again referring to FIG. 15, the image captured in the step S3 is recorded (stored) in the recording section 60 in a step S4.

In a step S5, whether or not the blur correction process is possible is determined. When it has been determined that the blur correction process is possible, a step S6 is performed. When it has been determined that the blur correction process is impossible, the process is terminated.

The blur correction process is performed in the step S6. In a step S7, whether or not the blur correction process performed in the step S6 has succeeded is determined. When it has been determined that the blur correction process has succeeded, a step S8 is performed. When it has been determined that the blur correction process has failed, the process is terminated.

In the step S8, the image subjected to the blur correction process is recorded (stored) in the recording section 60. The process ends upon completion of the step S8.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The configuration and the operation of the imaging device are not limited to those described in connection with the above embodiments. Various modifications and variations may be made.

What is claimed is:

1. An imaging device that captures an image using an imaging section, the imaging device comprising:
    a control section that controls a signal modulation process that modulates a signal level of an image signal acquired by the imaging section; and
    a blur correction section that performs a blur correction process on the image signal subjected to the signal modulation process,
    wherein an exposure period during which the imaging section captures an image starts at a first timing and ends at a second timing,
    wherein in the signal modulation process, the signal level is monotonically decreased or monotonically increased, from the first timing to the second timing, and
    wherein the control section controls the signal modulation process to decrease a number of zero points of an amplitude spectrum of a point spread function in a usage frequency range.

2. The imaging device as defined in claim 1, wherein the control section controls the imaging section so that the signal modulation process that monotonically and gradually decreases or monotonically and gradually increases the signal level of the image signal is performed from the first timing to the second timing.

3. The imaging device as defined in claim 1, wherein the control section controls the imaging section so that the signal modulation process that monotonically decreases or monotonically increases the signal level of the image signal is performed from the first timing to the second timing.

4. The imaging device as defined in claim 1, wherein the control section controls an optical system of the imaging section so that the signal modulation process that monotonically decreases or monotonically increases the signal level of the image signal is performed from the first timing to the second timing.

5. The imaging device as defined in claim 4, wherein the control section gradually closes or opens an aperture of the optical system from the first timing to the second timing.

6. The imaging device as defined in claim 4, wherein:
    the optical system includes a shutter for which a light transmittance is variably set, and
    the control section gradually decreases or increases the light transmittance of the shutter from the first timing to the second timing.

7. The imaging device as defined in claim 1, wherein:
    the imaging section includes a lighting section that applies light to an object, and
    the control section gradually decreases or increases an irradiation intensity of light emitted from the lighting section from the first timing to the second timing.

8. The imaging device as defined in claim 1, wherein the control section controls an image sensor included in the imaging section so that the signal modulation process that monotonically decreases or monotonically increases the signal level of the image signal is performed from the first timing to the second timing.

9. The imaging device as defined in claim 8, wherein the control section gradually decreases or gradually increases a period from a charge storage start timing to a charge transfer timing of the image sensor.

10. The imaging device as defined in claim 8, wherein the control section gradually decreases or increases a signal gain of a charge that is stored in and transferred from the image sensor.

11. The imaging device as defined in claim 1, wherein the blur correction section performs the blur correction process that obtains an original image before blurring based on a point spread function and the blurred image, the point spread function being estimated from a blurred image represented by the image signal subjected to the signal modulation.

12. The imaging device as defined in claim 11, wherein the blur correction section performs the blur correction process that obtains the original image of an entire image area based on the point spread function estimated within an image area that is smaller than the entire image area.

13. The imaging device as defined in claim 1, further comprising:
a blur correction possibility determination section that determines whether or not the blur correction process performed by the blur correction section is possible.

14. The imaging device as defined in claim 13, wherein the blur correction possibility determination section determines whether or not the blur correction process is possible based on sensor information from a sensor that detects a motion of the imaging device.

15. The imaging device as defined in claim 13, wherein the blur correction possibility determination section estimates a point spread function from a blurred image represented by the image signal subjected to the signal modulation process, and determines whether or not the blur correction process is possible based on the estimated point spread function.

16. The imaging device as defined in claim 15, wherein the blur correction section performs the blur correction process that obtains an original image before blurring using the point spread function estimated by the blur correction possibility determination section.

17. The imaging device as defined in claim 13, further comprising:
a recording section, an image obtained by the blur correction process being stored in the recording section as a captured image when the blur correction possibility determination section has determined that the blur correction process is possible, and an image that is not subjected to the blur correction process being stored in the recording section as the captured image when the blur correction possibility determination section has determined that the blur correction process is impossible.

18. The imaging device as defined in claim 1, further comprising:
a blur correction success/failure determination section that determines whether or not the blur correction process has succeeded.

19. A method of controlling an imaging device that captures an image using an imaging section, the method comprising:
controlling a signal modulation process that modulates a signal level of an image signal acquired by the imaging section; and
performing a blur correction process on the image signal subjected to the signal modulation process,
wherein an exposure period during which the imaging section captures an image starts at a first timing and ends at a second timing,
wherein in the signal modulation process, the signal level is monotonically decreased or monotonically increased, from the first timing to the second timing, and
wherein the signal modulation process is controlled to decrease a number of zero points of an amplitude spectrum of a point spread function in a usage frequency range.

20. The method of controlling an imaging device as defined in claim 19, further comprising:
controlling the imaging section so that the signal modulation process that monotonically and gradually decreases or monotonically and gradually increases the signal level of the image signal is performed from the first timing to the second timing.

21. The method of controlling an imaging device as defined in claim 19, further comprising:
controlling the imaging section so that the signal modulation process that monotonically decreases or monotonically increases the signal level of the image signal in a stepwise manner is performed from the first timing to the second timing.

\* \* \* \* \*